US009308554B2

(12) United States Patent
Campbell et al.

(10) Patent No.: US 9,308,554 B2
(45) Date of Patent: Apr. 12, 2016

(54) ULTRASONIC/ACOUSTIC TRANSDUCER

(75) Inventors: Ewan Fraser Campbell, Southampton (GB); Tony John Beswick, Southampton (GB); Peter Caplen, Southampton (GB)

(73) Assignee: Morgan Technical Ceramics Limited, Worcestershire (GB)

( * ) Notice: Subject to any disclaimer, the term of this patent is extended or adjusted under 35 U.S.C. 154(b) by 1063 days.

(21) Appl. No.: 13/374,317

(22) Filed: Dec. 21, 2011

(65) Prior Publication Data

US 2012/0163126 A1 Jun. 28, 2012

(30) Foreign Application Priority Data

Dec. 22, 2010 (GB) .................................. 1021719.8

(51) Int. Cl.
*H04B 1/06* (2006.01)
*B06B 1/06* (2006.01)

(52) U.S. Cl.
CPC .................................... *B06B 1/0614* (2013.01)

(58) Field of Classification Search
CPC .......... H04B 11/00; H04B 1/06; G10K 11/18; G10K 11/26; G10K 11/346; H01L 41/0475; H01L 27/0635; H01L 41/047; H01L 41/053; H01L 41/0825; H01L 41/098; H04M 1/2155; H04M 1/274516; H04M 1/505
USPC ........................... 367/135, 137; 310/327, 334
See application file for complete search history.

(56) References Cited

U.S. PATENT DOCUMENTS 2,865,014 A * 12/1958 Malm ........................... 367/104
3,212,056 A 10/1965 Grieg
3,831,710 A * 8/1974 Wirt .............................. 181/286
4,211,948 A * 7/1980 Smith et al. .................... 310/322
4,523,122 A * 6/1985 Tone et al. ..................... 310/334
4,811,307 A 3/1989 Pohlenz et al.
5,353,262 A * 10/1994 Yakymyshyn et al. ....... 367/149
5,410,205 A * 4/1995 Gururaja ........................ 310/328
5,638,822 A 6/1997 Seyed-Bolorforosh et al.
5,682,126 A * 10/1997 Plesski et al. ................. 333/193
5,945,770 A * 8/1999 Hanafy .......................... 310/322
6,483,225 B1 * 11/2002 Spigelmyer ............... 310/313 R
6,536,275 B1 * 3/2003 Durkee et al. ............. 73/290 V (Continued)

FOREIGN PATENT DOCUMENTS

EP 0451984 A2 10/1991
FR 2581821 A1 11/1986

OTHER PUBLICATIONS

Uchino; Introduction to Piezoelectric Actuators and Transducers International Center for Actuators and Transducers; Penn State University University Park, PA 16802; Jun. 2003.*

(Continued)

*Primary Examiner* — Luke Ratcliffe
*Assistant Examiner* — Amienatta M Ndure Jobe
(74) *Attorney, Agent, or Firm* — Kilpatrick Townsend & Stockton LLP; Dean W. Russell; Robert J. Curylo

(57) ABSTRACT

A transducer 1*b* comprising a vibrator body 2*b* for generating and/or receiving acoustic or ultrasonic waves, acoustically coupled to a second part 4 for generating and/or receiving acoustic or ultrasonic waves and, a matching layer 5 coupled to said vibrator body 2 so as, in use, to acoustically match the vibrator body 2*b* to a medium 6 contacting said matching layer 5.

39 Claims, 12 Drawing Sheets

(56) References Cited

U.S. PATENT DOCUMENTS

| | | | | |
|---|---|---|---|---|
| 2002/0128556 | A1 * | 9/2002 | Nakamura et al. | 600/459 |
| 2002/0153805 | A1 * | 10/2002 | Smith et al. | 310/311 |
| 2003/0173870 | A1 * | 9/2003 | Simon Hsu | 310/334 |
| 2004/0124746 | A1 * | 7/2004 | Suzuki et al. | 310/326 |
| 2005/0122003 | A1 * | 6/2005 | Goodson | 310/334 |
| 2008/0129146 | A1 * | 6/2008 | Puskas | 310/317 |

OTHER PUBLICATIONS

Search Report dated Apr. 21, 2011 in Application No. GB1021719.8.

Smith, "the Role of Piezocomposites in Ultrasonic Transducers," IEEE Proceedings of the Ultrasonic Symposium, pp. 755-766 (1989).

Tole, Nimrod M., Basic Physics of Ultrasonographic Imaging, 69 (Harald Ostensen ed., World Health Organization 2005), Chapters 2, 3, and 8, available at http://www.isradiology.org/isr/books_basic.php.

* cited by examiner

ULTRASONIC/ACOUSTIC TRANSDUCER

CROSS REFERENCE TO RELATED APPLICATION

This application claims the benefit of Great Britain Patent Application No. GB1021719.8 filed on Dec. 22, 2010, the contents of which are incorporated herein by reference.

FIELD OF THE INVENTION

The invention relates to acoustic or ultrasonic transducers, and more particularly acoustic or ultrasonic transducers for use in underwater SONAR applications.

INTRODUCTION

The use of transducers underwater for both high power transmitters and/or receivers of sound waves are commonly known in a number of SONAR (Sound Navigation And Ranging) applications. Typical applications include but not limited to ocean surveillance in security applications, detecting objects underwater such as fish finding, depth sounding, bathymetric imaging and underwater communication. The simplest of the underwater transducers generates and transmits a signal in the form of a pulse of sound and then listens for a returning reflection (echoes) of the signal. The time for transmission to reception of the pulse is thus measure of the range traveled by the sound wave. Typically, an underwater transducer known in the art comprises a single piezoelectric part, either in the form of a disc or plate, to generate two frequencies (e.g. 50 kHz/200 kHz), which can be automatically switched dependant on the range at which the SONAR is operating. It is known that the range by which the SONAR can adequately detect objects underwater and the resolution of the receiving signal is dependent upon the frequency of the SONAR or the duration of the pulses. The lower frequency range increases the range of the transducer and higher frequency improves the resolution but reduces the range. This is because the higher the frequency of the signal, the greater the sound signal is absorbed by sea water. Thus a compromise needs to be found between the low frequency range and the high frequency range. However, the primary limitation with this method is at least one of the frequencies will be low bandwidth. This results in poorer imaging quality. If a transducer is to offer acceptable performance for this application, then it must be able to receive sound waves with good sensitivity throughout a broad frequency band covering practically the entire usable band of sound frequencies, e.g. covering frequencies 50 kHz and 200 kHz with a wide bandwidth.

Multiple frequency wideband transducers with separate transducers are known in the art. FR2581821 teaches a multi-frequency Tonpilz type transducer for emitting and receiving in several passbands, by placing phase shifting circuits between the piezoelectric segments and a common conductor through which the excitation or output voltage flows, and switching these circuits by means of a logic unit, to the desired passbands. Similarly, U.S. Pat. No. 4,811,307 (Pohlenz, Charles) teaches a Tonpilz type piezoelectric transducer which can be used alternately as a wide band receiver and an emitter and includes a stack of pairs of piezoelectric segments separated by electrodes. U.S. Pat. No. 3,212,056 (Grieg, D.) teaches a dual transducer mounted at different angles in a single housing so that each transducer in the housing generates sonar beam signals in different directions respectively. Such wideband frequency transducers require complicated switching circuits to switch from one piezoelectric part having a defined resonant frequency to another piezoelectric part having a second defined resonant frequency.

Due to the mismatch between the piezoelectric element(s) and the outside environment, it is commonly known in the art to add a matching layer to the front of the transducer so as to acoustically match the impedance of the piezoelectric element(s) to the outside environment. However, the use of multiple frequency wideband transducers with separate transducers each having separate matching layers to produce a range of frequencies not only would mean that the switching circuitry involved in switching from one transducer type to another would be complex but a relatively large housing is needed to accommodate the different transducer types and corresponding matching layers. This may not be such an issue for ultrasonic transducers based on a transom mount whereby, in use, the transducer is thrown overboard into the water or sea but can be problematic for hull mounted or thru-mounted transducers. This is because either an excessively large hole would need to be drilled or cut out from the hull of the boat or depending upon the number of transducers needed, two or more holes cut out from the hull of the boat for each transducer needed. This will not only affect the aesthetic appearance of the boat design but the relatively large housing protruding beneath the boat or even a plurality of protrusions beneath the boat to accommodate the different transducers would create an unnecessary resistance to flow or drag on the boat.

U.S. Pat. No. 5,410,205 (Hewlett-Packard Company) relates to a transducer for transmitting and receiving ultrasonic energy at more than one frequency. The transducer includes first and second electrostrictive layers mechanically coupled together such that ultrasonic vibrations in one layer are coupled into the other layer. The first electrostrictive layer is laminated between upper and middle electrical contact layers, and the second electrostrictive layer is laminated between middle and lower electrical contact layers. A bias voltage arrangement selectively produces within the first and second electrostrictive layers electric fields orientated in opposite directions or electric fields orientated in the same direction. When the electric fields are orientated in opposite directions, the transducer has a first resonance frequency. Conversely, when the electric fields are orientated in the same direction, the transducer has a second resonance frequency.

EP 0451984 (Toshiba KK) relates to an ultrasonic probe system which is constituted by a stack of piezoelectric elements formed by stacking a plurality of piezoelectric layers such that the polarization directions of every two adjacent piezoelectric layers are opposite to each other or the polarization directions of all the piezoelectric layers coincide with each other, and bonding electrodes to two end faces of the stacked layers in the stacking direction and to the interface between the respective piezoelectric layers. The ultrasonic probe system is designed such that when a voltage higher than the coercive electric field of the piezoelectric layer is applied to each layer thereof, the polarity of the voltage is controlled to direct the electric fields of every two adjacent layers constituting the piezoelectric layer in substantially opposite directions or the electric fields of all the layers to the same direction, thereby selectively generating ultrasonic waves having a plurality of different frequencies.

U.S. Pat. No. 5,638,822 (Hewlett-Packard Company) relates to an ultrasonic probe which has a piezoelectric element having a plurality of piezoelectric layers each having a different acoustic impedance. The piezoelectric layers are stacked in progressive order of acoustic impedance such that the layer with the acoustic impedance nearest to that of the medium is proximate the medium. The oscillation resonance frequency is controlled by means of controlling the polarization of at least one of the piezoelectric layers in the piezoelectric element or selectively applying an oscillation voltage to one or more of the piezoelectric layers to alter the oscillation resonance frequency of the piezoelectric element.

An ultrasonic transducer is thus required that not only supports two or more frequencies allowing higher resolution and longer range options in a wideband SONAR application without the need for separate transducers but can be made in a single volume so as not take up much space and thereby, allow the housing to made much smaller and therefore, occupy a smaller volume than those that require more than one transducer.

Theoretical Consideration

An important property in the selection of materials in the design of acoustic or ultrasonic transducers is the acoustic impedance:

$$Z=\rho v \tag{1}$$

where Z is acoustic impedance, ρ is the density of the material and v is the speed of sound of the material in question.

However, due to the large impedance mismatch between the piezoelectric ceramic and the medium or load, particularly in water, a considerable amount of power is reflected back to the transducer and the bandwidth is small. In order to improve the acoustic impedance between the piezoelectric ceramic and the medium, it is well known to introduce one or more matching layers between the transducer and load in order to extend the bandwidth and efficiency of the transducer operating into the load. Equation 2 shows the method for selecting the optimum acoustic impedance of the matching layer for maximum energy transmission into the load:

$$Z_{ml(j)} = \sqrt[(n+1)]{Z_{tx}^{(n-j+1)} Z_L^{j}} \tag{2}$$

where n is the number of layers and j is the layer of interest, $Z_{ml}$ is the acoustic impedance of the matching layer of interest, $Z_{tx}$ is the acoustic impedance of the material for generating and/or receiving acoustic or ultrasonic waves, e.g. a piezoelectric element (for example Lead Zirconate Titanate (PZT)) and $Z_L$ is the acoustic impedance of the load.

It is also well known that a single matching layer of the geometric mean between transducer and load will extend bandwidth and transmission of acoustic power into the load.

$$Z_{ml}\sqrt{Z_L Z_{tx}} \tag{3}$$

Similarly, two or more matching layers can further increase bandwidth, by setting n=2 in Equation (2) provide:

$$Z_{ml(1)} = \sqrt[3]{Z_{tx}^2 Z_L} \tag{4}$$

$$Z_{ml(2)} = \sqrt[3]{Z_{tx} Z_L^2} \tag{5}$$

To improve the impedance matching, the thickness of the matching layer, $tk_{ml}$ is selected as:

$$tk_{ml} = \frac{n\lambda}{4} \tag{6}$$

Where n is an integer, λ is the wavelength of the sound in the layer, calculated from:—

$$\lambda = \frac{v_{ml}}{f_a} \tag{7}$$

where $f_a$ is the anti-resonant frequency and occurs at the maximum impedance of the material for generating and/or receiving ultrasonic or acoustic waves and $v_{ml}$ is the longitudinal velocity of sound in the matching layer. As opposed to the anti-resonant frequency, $f_a$, which occurs at the maximum impedance, the resonant frequency, $f_r$, occurs at the minimum impedance of the material for generating and/or receiving ultrasonic or acoustic waves, which is given by:

$$f_r = \frac{v_{pl}}{2tk_{pl}} \tag{8}$$

where $f_r$ is the resonant frequency of the material for generating and/or receiving ultrasonic or acoustic waves, $v_{pl}$ is the longitudinal velocity of the sound in the material for generating and/or receiving ultrasonic or acoustic waves and $tk_{pl}$ is the thickness of the material for generating and/or receiving ultrasonic or acoustic waves. In the case of a piezoelectric material, FIG. 1 shows a plot of the impedance from a typical piezoelectric material as a function of frequency. The resonant frequency, fr, lies in the vicinity of minimum impedance and the anti-resonant frequency, fa, lies in the vicinity of maximum impedance. Typically, values for the resonant frequency and the anti-resonant frequency are usually determined by measurement.

It is generally known that a 'quarter wavelength (λ/4) thick matching layer' as defined by equation 6 is an ideal transmitter of the acoustic power from one medium to another.

The most critical performance factors of an underwater acoustic transducer are the transmit response and the receive sensitivity. The receive sensitivity is the ratio of output voltage of the transducer produced over sound pressure sensed. The transmit response is the ratio of sound pressure produced to the input voltage. A hydrophone is an example of an acoustic transducer used to detect an underwater acoustic signal. The SI unit for sound pressure p is the pascal. However, as is commonly known in the art the pressure is usually measured as Sound Pressure Level (SPL). Sound Pressure Level (SPL) or sound level is a logarithmic measure of the effective sound pressure of a sound relative to a reference value. It is measured in decibels (dB) above a standard reference level. For normal underwater pressure, the reference pressure is taken as 1 upa (in air, the reference is 20 uPa). Thus:—

$$\text{Sound Pressure Level (dB)} = 20\log_{10}\left(\frac{P}{Pref}\right) \tag{9}$$

where P=is the sound pressure being measured and Pref is the reference sound pressure. As the sound source from a transducer is electrically driven, their transmission is usually related to the electrical signal used. The Transmit Voltage Response (TVR) is a measure of the ratio of the response to the applied voltage. The TVR is usually given as a decibel level referred to $$1\frac{\mu Pa}{V}$$

at 1 m at each frequency. The industry standard is to present the TVR in decibels referencing 1 uPa in water.

$$TVR=20\log_{10}(P/10^{-6}) \tag{10}$$

The receive voltage sensitivity (RVS) is the ratio of its output voltage to the sound pressure in the fluid surrounding it. The RVS is usually expressed as dB re $$1\frac{V}{\mu Pa}$$

and can be calculated from the TVR and the electrical impedance of the transducer, i.e.

$$RVS=TVR-20\log_{10}(F)+20\log|Z|-354 \tag{11}$$

The two-way performance of the transducer (transmitting and receiving) and thus, an illustrative measure of the transducer is given by the Figure of Merit (FOM). The FOM is the combination of the TVR and the RVS, which gives an indication of how the transducer will work in pulse-echo mode, i.e.

$$FOM=TVR+RVS \tag{12}$$

A transducer whose FOM response has a wide bandwidth is generally preferred over a transducer with a narrow bandwidth.

SUMMARY OF THE INVENTION

The present applicant has mitigated the above problems by providing a transducer comprising:— a vibrator body for generating and/or receiving acoustic or ultrasonic waves having:— i. a first anti-resonance frequency, ii. a second anti-resonance frequency and, b. a matching layer coupled to said vibrator body, so as, in use, to acoustically match the vibrator body to a medium contacting said matching layer, wherein said first anti-resonance frequency is substantially an odd multiple of said second anti-resonance frequency.

The present application has realised that by having a vibrator body for generating and/or receiving acoustic or ultrasonic waves (such as a piezoelectric material or a magnetostrictive material or a electrostrictive material) having a first anti-resonance frequency and a second anti-resonance frequency such that the first anti-resonance frequency is substantially an odd multiple of the second anti-resonance frequency, a single matching layer can be used to match the acoustic impedance of the vibrator body into the medium. The different anti-resonance frequencies can be provided by the vibrator body comprising multiple parts for generating and/or receiving acoustic or ultrasonic waves each part having its own characteristic anti-resonance/resonance frequency or provided by the same part for generating and/or receiving acoustic or ultrasonic waves forming the vibrator body (i.e. the vibrator body comprises a part). By having a matching layer having an acoustic impedance which can be made to acoustically match a vibrator body for generating and/or receiving acoustic or ultrasonic waves having multiple anti-resonant/resonant frequencies, the present invention allows the selection of multiple anti-resonant/resonant frequencies provided by the vibrator body within a single volume of the transducer.

Preferably, the vibrator body comprises a first part for generating and/or receiving acoustic or ultrasonic waves acoustically coupled to a second part for generating and/or receiving acoustic or ultrasonic waves. The first and second anti-resonance frequencies being provided by separate parts that are acoustically coupled together. Preferably, the first part has an anti-resonance frequency at the first anti-resonance frequency and the second part has an anti-resonance frequency at the second anti-resonance frequency. In a first arrangement of the vibrator body whereby the vibrator body comprises a first and second part, the present applicant has realised that for a matching layer to be designed to match the respective frequencies generated by the combination of the first part coupled to a second part and that generated by the first part alone so that they both benefit from higher frequency bandwidth, the anti-resonant frequency of the combined first part and second part is a suitable fraction to the anti-resonant frequency of the first part.

The first part and the second part are chosen so that their respective resonance frequencies or the anti-resonance frequency provided by the combination of the first and second part offers a wide frequency operational wideband without the need for separate transducers. More preferably, the matching layer matches the first part in a first frequency mode and the combination of the first and second part in a second frequency mode. Preferably, the matching layer will require the same acoustic impedance for both frequency modes. The range of frequencies by which the transducer can operate is thus dependent upon whether the first part is acoustically matched into the medium in the first frequency mode or the combination of the first and the second part is acoustically matched into the medium in the second frequency mode. The anti-resonant/resonant frequency of the first, second and the combination of first and second parts are selected from low or medium to high. For example, the anti-resonant/resonant frequencies of the respective first and/or second part can be chosen so that the transducer operates over a low frequency range or a medium frequency range or a high frequency range. However, there is no restriction to which part covers the low frequency range or the high frequency part as any combination of the first part or the second part or the combination of the first part coupled to the second part can be chosen to operate over the different frequency modes. Preferably, the low frequency range is up to 50 kHz, the medium frequency range is from 50 kHz to 150 kHz and the high frequency range preferable covers 150 kHz to 250 kHz.

In terms of the thickness of the matching layer given by equation 6, the quarter wavelength thickness of the matching layer associated with the first part equates to substantially an odd multiple of the quarter wavelength thickness of the matching layer associated with the combination of the first and second part. Applying equation 6, n is thus substantially equal to an odd number, e.g. 1, 3, 5 etc. According to equation 6, the quarter wavelength thickness of the matching layer is proportional to the wavelength of sound in the matching layer, λ, and since according to equation 7 the wavelength of the sound in the matching layer, λ, is proportional to the anti-resonant frequency of the vibrator body for generating and/or receiving acoustic or ultrasonic waves that is matched into the medium, then it follows that the first anti-resonant frequency is substantially an odd multiple of the second anti-resonant frequency. Based on this principle, it then follows that the anti-resonant frequency associated with the first part is substantially an odd multiple of the anti-resonant frequency associated with the combination of the first and second part. Preferably, a) the first part has a first anti-resonant frequency, b) the combined first part and second part has a second anti-resonance frequency, and wherein the first anti-resonant frequency is substantially an odd multiple of the second anti-resonant frequency.

The ratio of the anti-resonant frequency, fa, and the resonant frequency, fr, can be approximated to a constant and as the quarter wavelength thickness (λ/4) of the matching layer associated with the first part is substantially an odd multiple of the quarter wavelength thickness (nλ/4) of the matching layer associated with the combined first and second part, and considering that the first part resonates at the first resonance frequency and the first part acoustically coupled to the second part resonates at the second resonance frequency, then it can be approximated that the first resonance frequency associated with the first part is substantially an odd multiple of the second resonance frequency associated with the combined first and second part. Thus, for example, by selecting odd frequencies (anti-resonance) a ¾λ matching layer thickness at one frequency is equal to a ¼λ matching layer thickness at a lower frequency. Hence, this matching layer facilities wide bandwidth for both the low frequency mode and the high frequency mode.

Applying the same principle of the present invention to a different arrangement of the vibrator body comprising a part for generating and/or receiving acoustic or ultrasonic waves, the different anti-resonance frequencies of the vibrator body can be provided by the same part for generating and/or receiving acoustic or ultrasonic waves. Thus, instead of having a vibrator body comprising a first part that is acoustically coupled to a second part, the present applicant has realised that the vibrator body can be built up from a single part by utilising the different modes of vibration of that part forming the vibrator body. In order for a matching layer to be designed to match the respective frequencies of the same part having a first vibration mode and a second vibration mode so that they both benefit from a higher frequency bandwidth, the second anti-resonance frequency associated with the second vibration mode is a suitable fraction of the first anti-resonance frequency associated with the first vibration mode. Preferably, the first anti-resonance frequency is provided by the first vibration mode of a part and the second anti-resonance frequency is provided by the second vibration mode of that part forming the vibrator body.

If the different modes of vibration of the vibrator body cover a wide frequency band, then it is possible to create a vibrator body having a wide frequency band, each frequency provided by the different modes of vibration of the vibrator body. Materials for generating and/or receiving acoustic or ultrasonic waves naturally have multiple modes of vibration, each mode of vibration associated with a different anti-resonant (or resonant frequency) frequency. This can be explained by the Poisson effect. Take for instance a piezoelectric material as an example of a material for generating and/or receiving acoustic or ultrasonic waves. Although the piezoelectric material is polled along the polarization axis, by electrically driving the piezoelectric material along the polarization axis would naturally cause distortions of the material perpendicular to the polarization axis. Thus when the piezoelectric is compressed in one direction, it usually tends to expand in the other two directions perpendicular to the direction of compression. As a result of the Poisson phenomenon, a single material for generating and/or receiving acoustic or ultrasonic waves, e.g. a piezoelectric crystal or a magnetostrictive material or an electrostrictive material or formed as a composite material, has multiple modes of vibration, each mode of vibration being associated with a particular anti-resonance frequency of that part.

The different modes of vibration of the part forming the vibrator body is thus dependent upon the shape of the vibrator body for generating and/or receiving acoustic or ultrasonic waves. In the particular example, the vibrator body comprises a part for generating and/or receiving ultrasonic or acoustic waves. A single part for generating and/or receiving acoustic waves has traditionally been used in two modes of vibration. Although, using two vibration modes of a single part is known in the art, each mode of vibration would only offer a narrow band of frequencies. The materials and/or geometric shape of the part forming the vibrator body are chosen so that the respective anti-resonance frequencies provided by the first and second vibration mode offers a wide frequency operational wideband without the need for separate parts or separate transducers. The range of frequencies by which the transducer can operate is thus dependent upon whether the first mode of vibration is acoustically matched into the medium in a first frequency mode or the second mode of vibration is acoustically matched into the medium in a second frequency mode. Preferably, the matching layer matches the acoustic impedance of the first vibration mode in a first frequency mode and the second vibration mode in a second frequency mode. The matching layer will require the same acoustic impedance for both frequency modes. The first frequency mode could be associated with anyone of the lateral or radial or thickness or width mode of vibration of the part, the second frequency mode could be associated with anyone of the lateral or radial or thickness or width mode of vibration of that part (vibrations along anyone of the axes). For example, taking the vibrator body to be a piezoelectric disc, and consider the two modes of vibration, the radial mode and the thickness mode, the range of frequencies by which the transducer can operate is thus dependent upon whether the thickness mode of vibration is acoustically matched into the medium in the first frequency mode or the radial mode of vibration is acoustically matched into the medium in a second frequency mode. For example, for a disc shaped material for generating and/or receiving acoustic or ultrasonic waves, the first frequency mode and the second frequency mode is given by vibrational modes shown in FIG. 5*a* or FIG. 5*b* (thickness mode and radial). The anti-resonant or the resonant frequency of the first and the second modes of vibration are selected from low or medium to high. For example, the anti-resonant or resonant frequencies of the respective first and/or second mode of vibration can be chosen so that the transducer operates over a low frequency range or a medium frequency range or a high frequency range. However, there is no restriction to which mode of vibration covers the low frequency range or the high frequency range as any combination of the first mode of vibration or the second mode of vibration can be chosen to operate over the different frequency modes. Again as with the first arrangement of the vibrator body, preferably, the low frequency range is up to 50 kHz, the medium frequency range is from 50 kHz to 150 kHz and the high frequency range preferable covers 150 kHz to 250 kHz.

In terms of the thickness of the matching layer, the quarter wavelength thickness of the matching layer associated with the first vibration mode equates to substantially an odd multiple of the quarter wavelength frequency of the matching layer associated with the second vibration mode. Applying equation 6, n is thus equal to an odd number, e.g. 1, 3, 5 etc. Take the example of a piezoelectric plate having modes of vibrations along thickness direction 40*a* and along the lateral direction 40*b* of the plate (FIGS. 6*a* and 6*b*), then the quarter wavelength thickness of the matching layer associated with the mode of vibration along the thickness of the plate is substantially an odd multiple of the quarter wavelength thickness of the matching layer associated with the lateral mode of vibration. Again according to equation 6, the quarter wavelength thickness of the matching layer is proportional to the wavelength of sound in the matching layer, λ, and since according to equation 7 the wavelength of the sound in the matching layer, λ, is proportional to the anti-resonant frequency of the vibrator body for generating and/or receiving acoustic or ultrasonic waves that is matched into the medium, then it follows that the vibrator body has a first anti-resonant frequency and a second anti-resonant frequency. Where the vibrator body comprises a part for generating and/or receiving acoustic or ultrasonic waves, then it follows that the first anti-resonant frequency provided by the first vibration mode of the part is substantially an odd multiple of the second anti-resonant frequency provided by the second vibration mode of that part.

Preferably, a) the first vibration mode has an anti-resonant frequency at a first anti-resonant frequency, b) the second vibration mode has an anti-resonant frequency at a second anti-resonant frequency, and wherein the first anti-resonant frequency is substantially an odd multiple of the second anti-resonant frequency. The ratio of the anti-resonant frequency, fa, and the resonant frequency, fr, can be approximated to a constant and as the quarter wavelength thickness (λ/4) of the matching layer associated with the first vibration mode is substantially an odd multiple of the quarter wavelength thickness (nλ/4) of the matching layer associated with the second vibration mode, and considering that the first vibration mode resonates at a first resonant frequency, the second vibration mode resonates at a second resonant frequency, then it can be approximated that the first resonant frequency associated with the first vibration mode is substantially an odd multiple of the second resonant frequency associated with the second vibration mode. Thus, for example, by selecting odd frequencies a ¾λ matching layer thickness at one frequency is equal to a ¼λ matching layer thickness at another frequency. Hence, this matching layer facilities wide bandwidth for both the low frequency mode and the high frequency mode of the same part. Take the piezoelectric disc as an example, a ¾λ matching layer thickness at one frequency associated with the thickness mode of vibration is equal to a ¼λ matching layer thickness at an another frequency associated with the radial mode of vibration of the disc. It does not matter which mode of vibration are taken as along they agree with the present invention, i.e. the anti-resonance frequencies being an odd multiple.

Alternatively, the transducer can be operated so that anyone of the combination of the vibrator body is driven in the first arrangement or second arrangement of the vibrator body. For example, the range of frequencies can be provided by not only driving the separate parts of the vibrator body but also the different modes of vibration in anyone of the parts.

Materials for generating and/or receiving ultrasonic or acoustic waves such as piezoelectric materials vibrate in two or more planes, often a thickness and a radial plane. Preferably, the vibrator body comprises a composite comprising a material for generating and/or receiving ultrasonic or acoustic waves and a passive material. By forming the vibrator body or anyone one of the parts (first or second part) forming the vibrator body into a composite, the lateral mode is suppressed and the performance in the thickness direction significantly improves. In the present invention, a passive material is a material that does not generate ultrasonic/acoustic waves, e.g. a polymer. There are various techniques in the art to manufacture a composite structure. For example, where the material for generating and/or receiving ultrasonic/acoustic waves is a piezoelectric material, the technique involves but not limited to suitably arranging piezoelectric rods in a polymer and then slicing off disks perpendicular to the rods (otherwise known as piezocomposites). Other techniques include the 'dice and fill technique' whereby deep grooves are cut out in the piezoelectric ceramic and either a polymer (epoxy, polyurethane, syntactic polymer, thermoplastic) is cast into the grooves or left as air filled voids ("The Role of Piezocomposites in Ultrasonic Transducers" by Wallace Arden Smith, IEEE Proceedings of the Ultrasonic Symposium, 1989, pp. 755-766). For example, in the case of the first arrangement of the vibrator body, the first and/or second part for transmitting and receiving ultrasonic/acoustic waves is/are a first and/or second piezocomposite comprising a piezoelectric material for transmitting and receiving ultrasonic/acoustic waves and a passive material. In the case of the second arrangement of the vibrator body, then the part forming the vibrator body can simply be a piezocomposite which is driven to provide different modes of vibration along the radial or lateral or thickness or width of the piezocomposite depending upon its geometric shape.

Preferably, the composite body comprises alternate layers of the material for generating and/or receiving ultrasonic or acoustic waves and the passive material. One way of layering the composite material is preferably by dicing the material for generating and/or receiving acoustic or ultrasonic waves in one direction. An example of a layered composite structure is a composite having a 2-2 arrangement. In the 2-2 composite arrangement, both the material for generating and/or receiving ultrasonic or acoustic waves and the passive material are continuous in two dimensions with the lengths of the material for generating and/or receiving ultrasonic or acoustic waves and the passive material arranged in parallel (see FIG. 7). In this arrangement, the mode of vibration along the lateral direction (y-axis) is suppressed and the modes of vibrations in other the two directions (thickness and width) is improved. In this way, the different of modes of vibration of the vibrator body can be controlled by controlling the structure of the composite material or the arrangement of the material for generating and/or receiving acoustic or ultrasonic waves and the passive material, e.g. how it is layered or diced.

The advantage in using composite materials as opposed to conventional bulk materials for generating and/or receiving ultrasonic/acoustic waves is the flexibility by which the acoustic impedance and resonant frequency can be controlled/tailored to match the medium under investigation, e.g. water. Typically, forming the material into a composite as opposed to the bulk material has a tendency to shift the resonant frequency of the material downward. Other advantages of the use of composites include improved frequency bandwidth, reduced lobes, increase reception sensitivity and reduced cross coupling in arrays. However, fundamentally this has been achieved by suppressing one of the frequency modes of operation meaning the longer range option (low frequency range) is sacrificed, the higher resolution option (high frequency range) is sacrificed or there is compromise between the two.

More preferably and according to the present invention, the first anti-resonance frequency is associated with a first geometry and the second anti-resonance frequency is associated with a second geometry. Thus, in the case of the first arrangement of the vibrator body comprising a first part for generating and/or receiving acoustic or ultrasonic waves acoustically coupled to a second part for generating and/or receiving acoustic or ultrasonic waves, then the geometry of the first part and/or the geometry of the second part is/are tailored so that when the second part is combined with the first part, the first anti-resonance or resonance frequency associated with the first part is substantially an odd multiple of the second anti-resonance or resonance frequency associated with the combined first and second part (anti-resonant frequency of the combined first and second part). In the case of the second arrangement of the vibrator body, then the geometry of the part forming the vibrator body is tailored such that the first anti-resonance or resonance frequency associated with the first vibration mode is substantially an odd multiple of the second anti-resonance or resonance frequency associated with the second vibration mode of that part. The geometry of the vibrator body is related to the physical parameters of the vibrator body or the part forming the vibrator body such as the shape or size or anyone of the physical dimensions of the vibrator body/part, e.g. thickness. Preferably, the first geometry is different to the second geometry. More preferably and in accordance to equation 8, the resonant frequency of the composite material varies with the thickness of the composite material.

As the resonant frequency of the composite material for generating and/or receiving ultrasonic/acoustic waves varies with the geometry of the material, the geometry of the composite material can be tailored so that in the first arrangement of the vibration body the first part and when combined with the second part in a single volume can be effectively matched into the medium. Likewise in the second arrangement of the vibrator body, the geometry of the composite material can be tailored so that a part forming the vibrator body can be effectively matched into the medium. Whilst the frequency at which it resonates varies with the shape or size of the composite material (e.g. thickness) according to equation 8, the acoustic impedance of the composite material can be varied by varying the density of the composite material which in turn is dependent upon the relative proportion of the material for generating and/or receiving ultrasonic/acoustic waves to the passive material. Thus by varying the thickness of the vibrator body in combination to their composition (density), the present applicant can tailor the vibrator body so that the quarter wavelength thickness of the matching layer associated with the first part is substantially an odd multiple of the quarter wavelength thickness of the matching layer associated with the first part coupled to the second part. Likewise, in the second arrangement of the vibrator body, the vibrator body can be tailored so that the quarter wavelength thickness of the matching layer associated with the first vibration mode of the part forming the vibrator body is substantially an odd multiple of the quarter wavelength thickness of the matching layer associated with the second mode of vibration of that vibrator body.

Generally it is found that for bulk piezoelectric materials, the relationship between the resonant frequency, $f_r$, and the anti-resonant frequency, $f_a$, is dependent upon the geometry of the material such as aspect ratio of the thickness to the lateral dimension whereas in the case of a composite material, this relationship is dependent upon the composition or type of the material. Thus, depending upon the proportion of the material for generating and/or receiving ultrasonic/acoustic waves and the passive material, the ratio of the anti-resonant frequency to the resonant frequency can be approximated to 1.05 to 2, which is equivalent to an electromechanical coupling coefficient, k33 of 0.33 to 0.89 (the electromechanical coupling coefficient is the effectiveness with which the piezoelectric material converts electrical energy into mechanical energy and vice versa). For example, in the first arrangement of the vibrator body where the first and the second part is a first and second piezocomposite material respectively comprising 50% volume fraction of PZT4D material and where the first part is 9.6 mm thick, the second part is 19.2 mm thick, and hence, the total thickness is 28.8 mm thick, gives access to thickness mode frequencies of 52 kHz (+/−15 kHz) for the total thickness, 156 kHz (+/−50 kHz) for the first piezocomposite, all within 3 dB variation. Such transducers have varying applications in the field of SONAR It has been found that a matching layer that posses the desired acoustic impedance to acoustically match the acoustic impedance of the vibrator body comprises carbon, more preferably graphite.

In a second embodiment of the present invention, the vibrator body is similarly arranged as in the first arrangement of the first embodiment of present invention whereby the vibrator body comprises a first part for generating and/or receiving ultrasonic or acoustic waves acoustically coupled to a second part for generating and/or receiving ultrasonic or acoustic waves. However, the vibrator body is arranged so that the geometry of the first and the second part can be tailored so that the first part provides an additional matching layer for matching the second part to the medium. By utilising the first part as an additional matching layer for the second part and by making the second part to operate over a relatively low frequency, i.e. 50 kHz to 100 kHz, the transducer according to the present invention can be tailored to operate over a low frequency band. Preferably, the first part can be made a matching layer of the second part by tailoring its acoustic impedance so that it acoustically matches the acoustic impedance of the second part into the medium. More preferably, the second part is acoustically matched into the medium by a first and a second matching layer at a second frequency mode, the first matching layer being said first part and the second matching layer being said matching layer. The acoustic impedance of said first part is acoustically matched by said matching layer at the first frequency mode. Optionally, the first frequency mode is different from the second frequency mode. Ideally, the quarter wavelength thickness of the matching layer(s) associated with the first part and the second part agrees with equation 6. Preferably, the quarter wavelength thickness of the matching layer of the first part is substantially an odd multiple of the quarter wavelength thickness of the matching layer of the second matching layer of the second part, e.g. where n is equal to 3 and 1 respectively or vice-versa. However, due to the limited availability of materials with the appropriate acoustic impedance to satisfy the ideal condition, the present applicant has realised that the thickness of the matching layer preferably lies between the quarter wavelength thickness of the second matching layer of the second part at the second frequency mode and the quarter wavelength thickness of the matching layer of the first part at the first frequency mode. This effectively provides a condition whereby the first part and/or second part is acoustically matched into the medium without significantly affecting the bandwidth.

Preferably, the material of the first and/or the second part are a first and/or second composite material as discussed above. For example, where the first/second part is/are a composite material, the acoustic impedance of the first/second part can be tailored by varying the density of the composite material according to equation 1. More preferably, the acoustic impedance of the first part can be selected at a suitable value to provide acoustic matching of the second part into the medium. Likewise, the acoustic impedance of the second part can be selected so as to be effectively matched by the first part. As discussed above, varying the density of the composite material is achieved by controlling the volume fraction of the material for generating and/or receiving ultrasonic/acoustic waves to a passive material.

As the second part is tailored to (e.g. an acoustic impedance of 19.5 MRayls) generate the low frequency mode and the first part (e.g. an acoustic impedance of 8.25 MRayls) provides the first matching layer for the second part, the matching layer according to the present invention provides the second matching layer of the second part and according to equations 4 and 5 is provided by a material of appropriate acoustic impedance, e.g. substantially 3.5 MRayls in this example. Typical materials possessing the appropriate acoustic impedance to selectively match the first part or second part or the combination of both, preferably comprises carbon, more preferably graphite. By having a double matching layer according to equation 4 and 5, one provided by the first part and the other by the matching layer, further increases the bandwidth of the transducer. Since the second part can be chosen to operate at a low frequency, the low frequency mode of the transducer is thus subject to the double matching layer. Whilst, the second part provides the low frequency range of the transducer, the first part can be tailored to provide the high frequency range of the transducer. Thus, the matching layer is tailored to acoustically match the acoustic impedance of the first part into the medium and as the first part covers a higher frequency range, the transducer can operate over a higher frequency wideband. For example, when considering the acoustic impedance of the material, a first part having an acoustic impedance of 8.25 MRayl matching into 1.5 MRayl medium, a matching layer of 3.5 Mrayls would be suitable to provide wide frequency bandwidth, so the same matching layer as for the double matching can be used. As a result, the acoustic impedance of the matching layers is the same for the first part and the second part. Typical matching layer materials that possess this acoustic impedance comprise carbon, more preferably graphite.

Thus, as with the first embodiment of the present invention, the frequency at which the part resonates can be engineered, in the case of composite materials, by controlling the geometry of the material, the geometry being the shape or size or the thickness of the composite material according to equation 8, whereas the acoustic impedance can be controlled by controlling the proportion of material for generating and/or receiving ultrasonic/acoustic waves and a passive material. Alternatively, bulk materials for generating and/or receiving ultrasonic waves with the appropriate acoustic impedance and thus, anti-resonant frequency can be used. These include piezoelectric materials or magnestrictive materials or electrorestrictive materials.

The advantage of the second embodiment over the first embodiment is that the low frequency mode is subject to a double matching layer and hence an improved gain-bandwidth product in this mode. However, the advantage of first embodiment over second embodiment is the lower frequency mode can be made lower. Thus, whether the first or second embodiment is chosen will be dependent upon whether a lower frequency is important in the transducer or whether increased bandwidth and thus, resolution is important.

For both the first and second embodiment of the present invention and where the first and/or second part forming the vibrator body or part forming the vibrator body is a bulk material or a composite, the material for generating and/or receiving ultrasonic waves is selected from the group consisting of piezoelectric or magentostrictivie or electrorestrictive. Where the material is a piezoelectric, then the types of materials include but not limited to Navy type I (specifically PZT4D), Navy type II (PZT5A), Navy type III (PZT8), Navy type IV (Barium Titanate), Navy Type V (PZT5J), Navy Type VI (PZT5H) or any custom piezoelectric material.

Preferably, the transducer further comprises a backing layer at the rear side of the vibrator body for absorbing ultrasonic waves from the vibrator body. More preferably, the acoustic impedance of the backing layer is the same as the acoustic impedance of the vibrator body, or within half an order of magnitude. In the case, where the vibrator body is arranged to comprise a first and second part for generating and/or receiving ultrasonic or acoustic waves and taking the second part forming the rear of the vibrator body and the first part coupled to the matching layer, then the backing layer is located adjacent the second part such that the acoustic impedance of the backing layer is the same as the acoustic impedance of the second part. The air like backing is optional (such as cork, polyurethane foam or Sonite). Due to space constraints it is often difficult to use an epoxy backing at low frequencies. Air backing provides the added advantage of improved sensitivity. If the wider bandwidth provided by an epoxy backing is required, the air backing is omitted and a form of absorbing backing material is located adjacent to the vibrator body. The function of this backing is to allow an acoustic signal to exit via the rear of the vibrator body; hence it should have similar acoustic impedance to the vibrator body. However, despite the backing layer being absorptive, there may be incidents whereby a portion of the rearward wave would travel through the backing material without being absorbed and reflect from the back of the housing and thereby interfere with the drive or receiving signal of the transducer on its return. To limit the effects of the reflection wave interfering with the drive signal or the receiving signal, the backing layer functions to delay the returning reflected wave from interfering with the drive or receiving signal to an extent that any of the reflected wave that passes through the transducer occurs after the transducer has generated or received the acoustic signal. In order for the backing layer to function to delay the reflected layer from interfering with the drive or receiving signal, the thickness and/or the acoustic impedance of the backing layer is made such that the returning reflective waves approaches the vibrator body after the transducer has generated and/or received the acoustic signal. To separate the acoustic signal emitted into the backing layer from the drive or receive signal, preferably, the thickness of the backing layer is equally to $n\lambda/2$, where n is the number of cycles bursts of the transducer, where each cycle burst of the transducer represents the period of oscillation of the transducer and $\lambda$ is the wavelength of sound in the backing layer. For example, considering driving the transducer with up to a 10 cycle burst, each cycle representing the period of vibration of the transducer, then to limit interference with the drive or receiving signal, the thickness of the backing layer should be $10\times\lambda/2$ Preferably, the backing layer comprises epoxy resin. Alternatively or in addition to having an absorptive backing layer that functions to delay and attenuate the returning reflected wave from reaching the transducer, the backing layer can function to diffract the waves away from the transducer. Preferably, the backing layer is serrated so as to diffract the acoustic signal away from the transducer.

Further preferred features and aspects of the invention will be apparent from the dependent claims and the following description of an illustrative embodiment, made with reference to the accompanying drawings.

DETAILED DESCRIPTION

FIG. 1 is a plot showing the relationship between the impedance of a piezocomposite material versus the frequency to demonstrate the areas of the resonance and anti-resonant frequency of the material, FIG. 2 is a perspective view of an apparatus comprising a transducer according to a first embodiment of the present showing the arrangement of a first and second part of a vibrator body and a matching layer.

Figure 10:
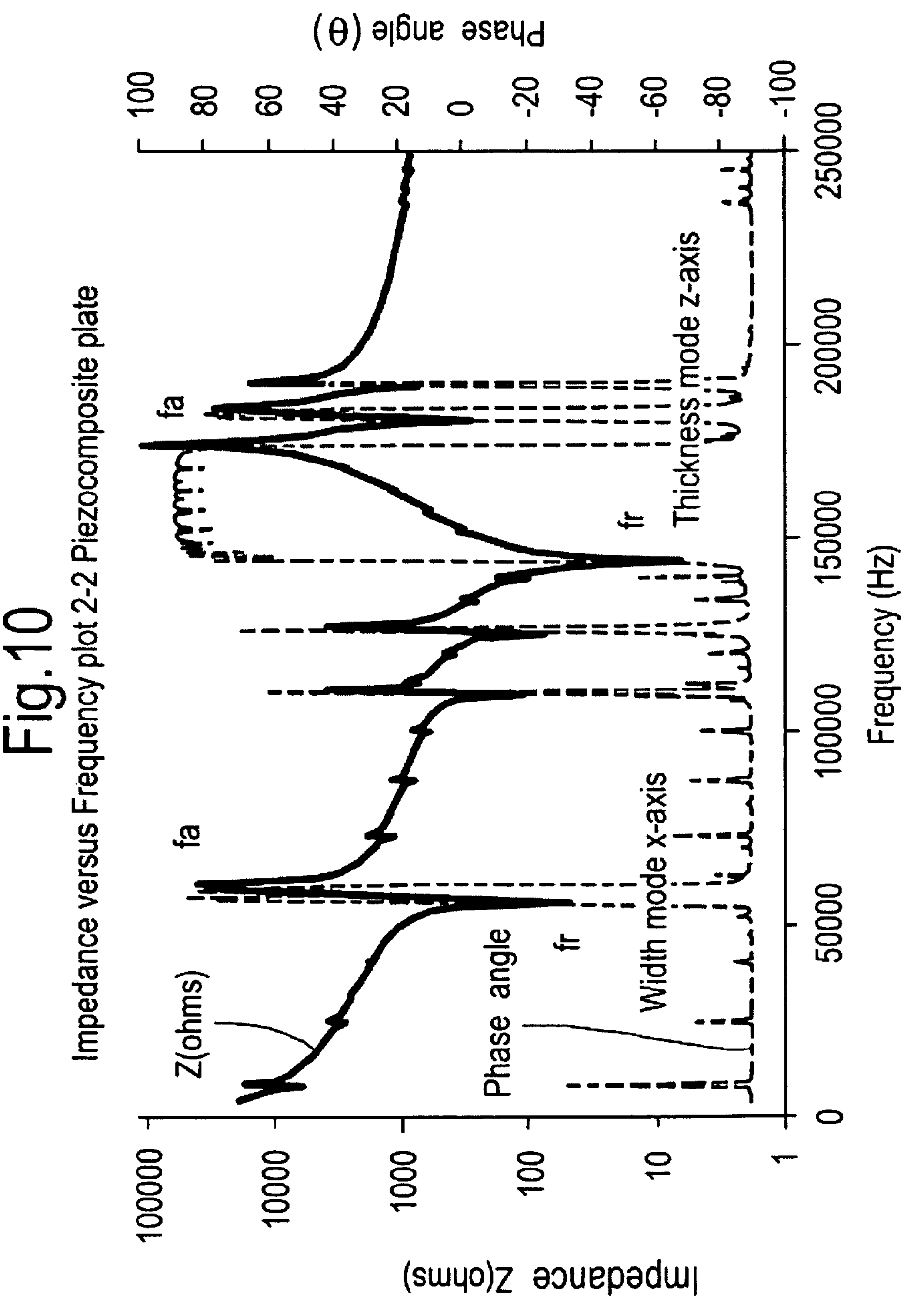

FIG. 10. shows the relationship of the electrical impedance of a 2-2 piezocomposite material versus frequency to demonstrate the areas of the resonance and anti-resonance frequency of the material.

Figure 11:
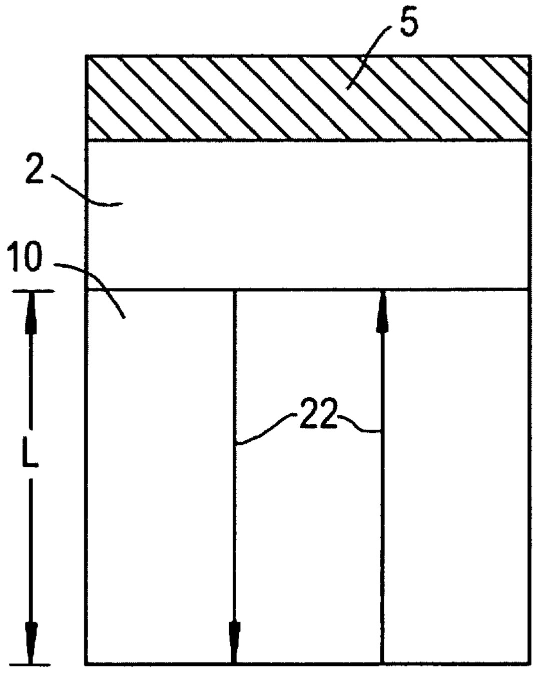

FIG. 11 is a perspective view of the vibrator body of the transducer in relation to the backing layer.

Figure 12:
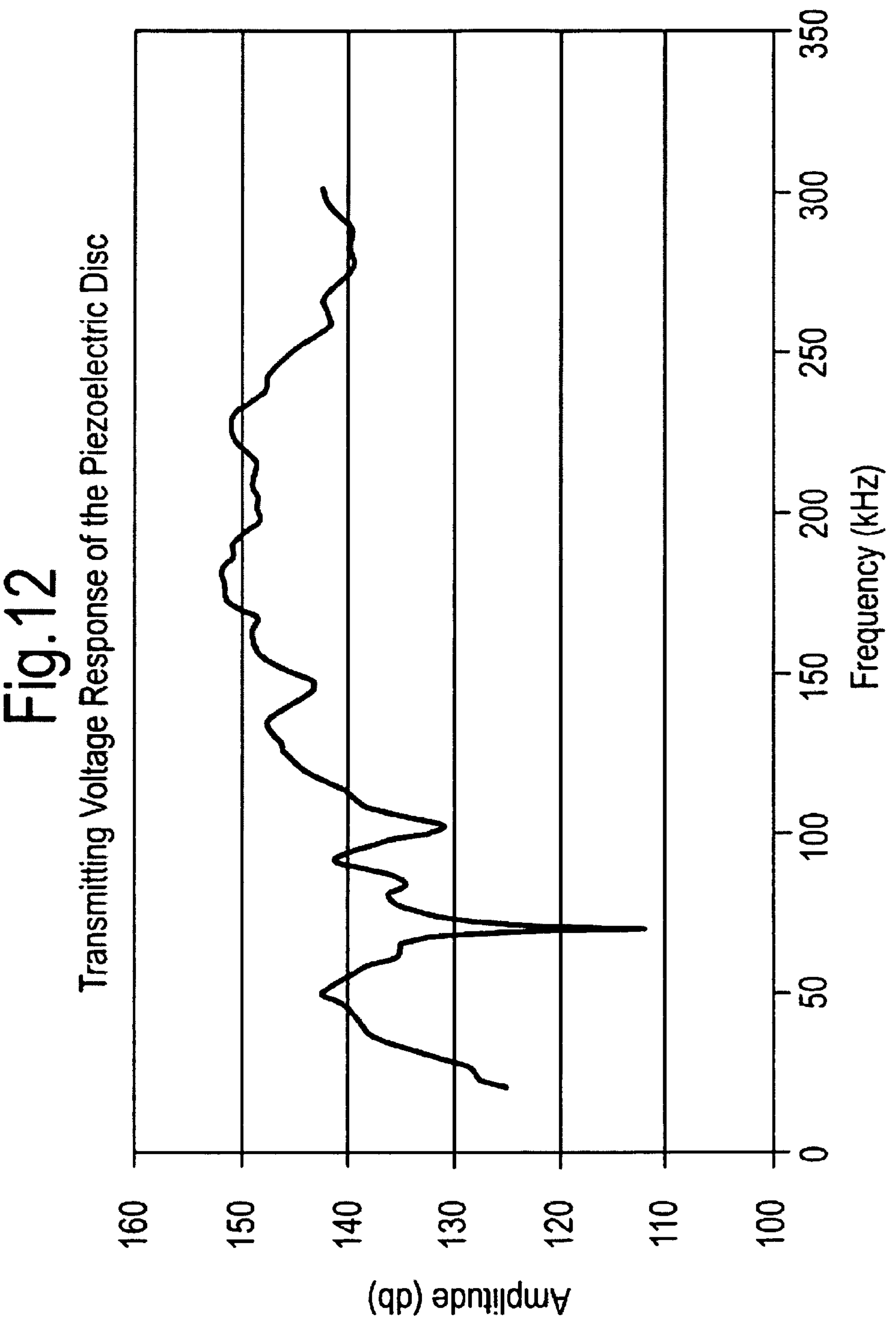

FIG. 12 is a plot showing the Transmitting Voltage Response of the piezoelectric disc in Example 4.

Figure 13:
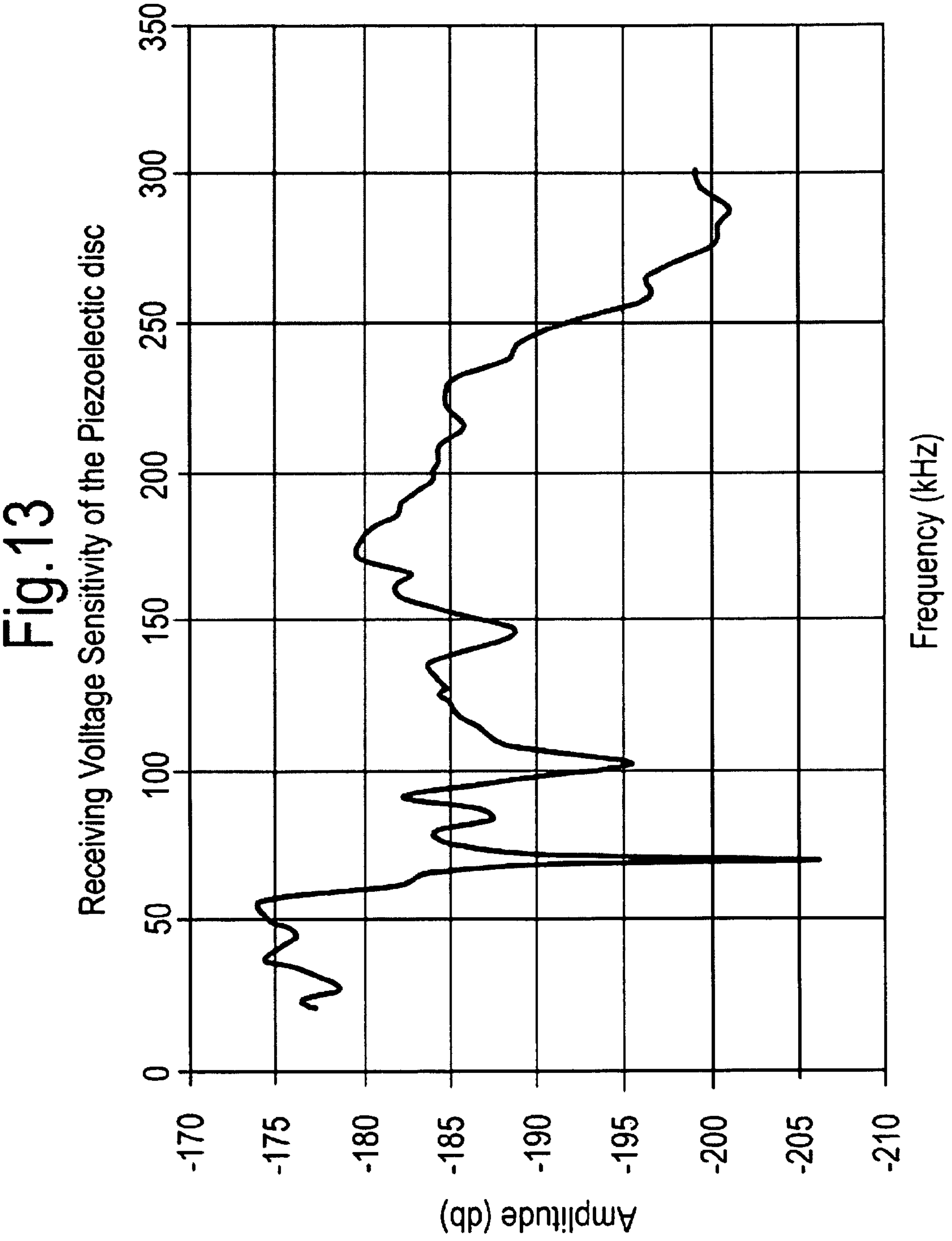

FIG. 13 is a plot showing the Receiving Voltage Sensitivity of the piezoelectric disc in Example 4.

Figure 9:
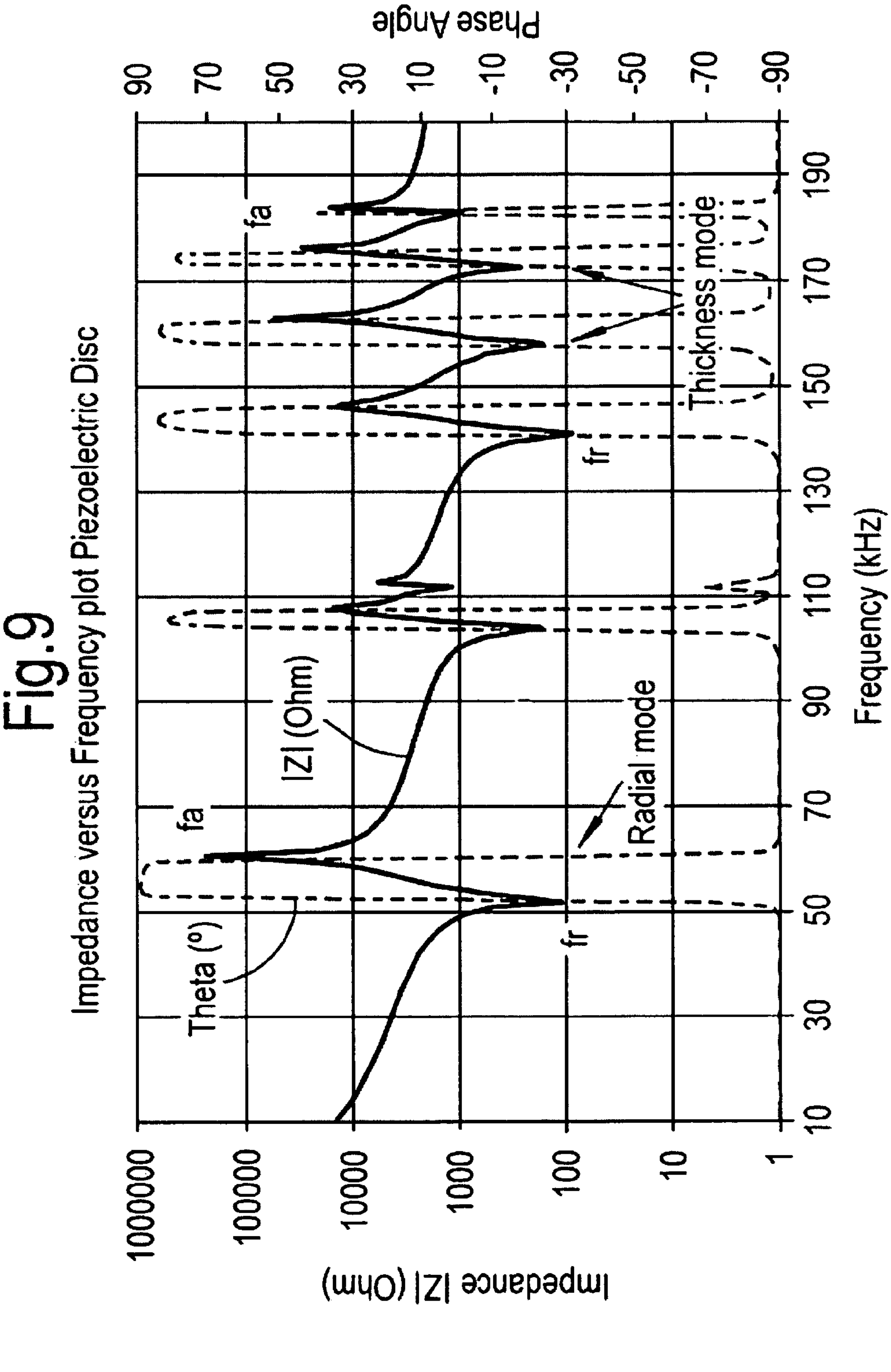
FIG. 9 shows the relationship of the electrical impedance of a bulk piezoelectrical material versus frequency to demonstrate the areas of the resonance and anti-resonance frequency of the material.
Figure 14:
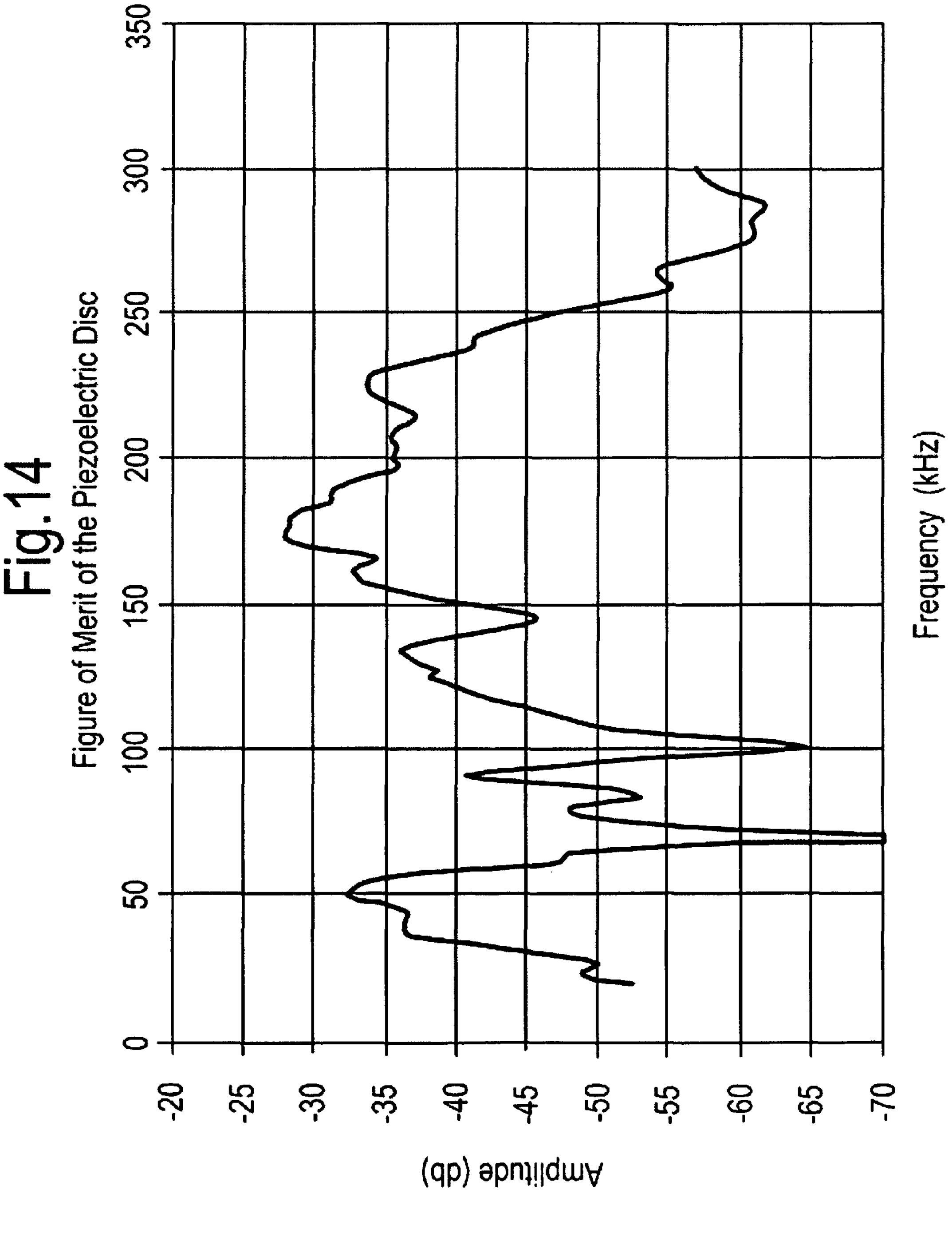

FIG. 14 is a plot showing the Figure of Merit of the piezoelectric disc in FIG. 9.

Figure 2:
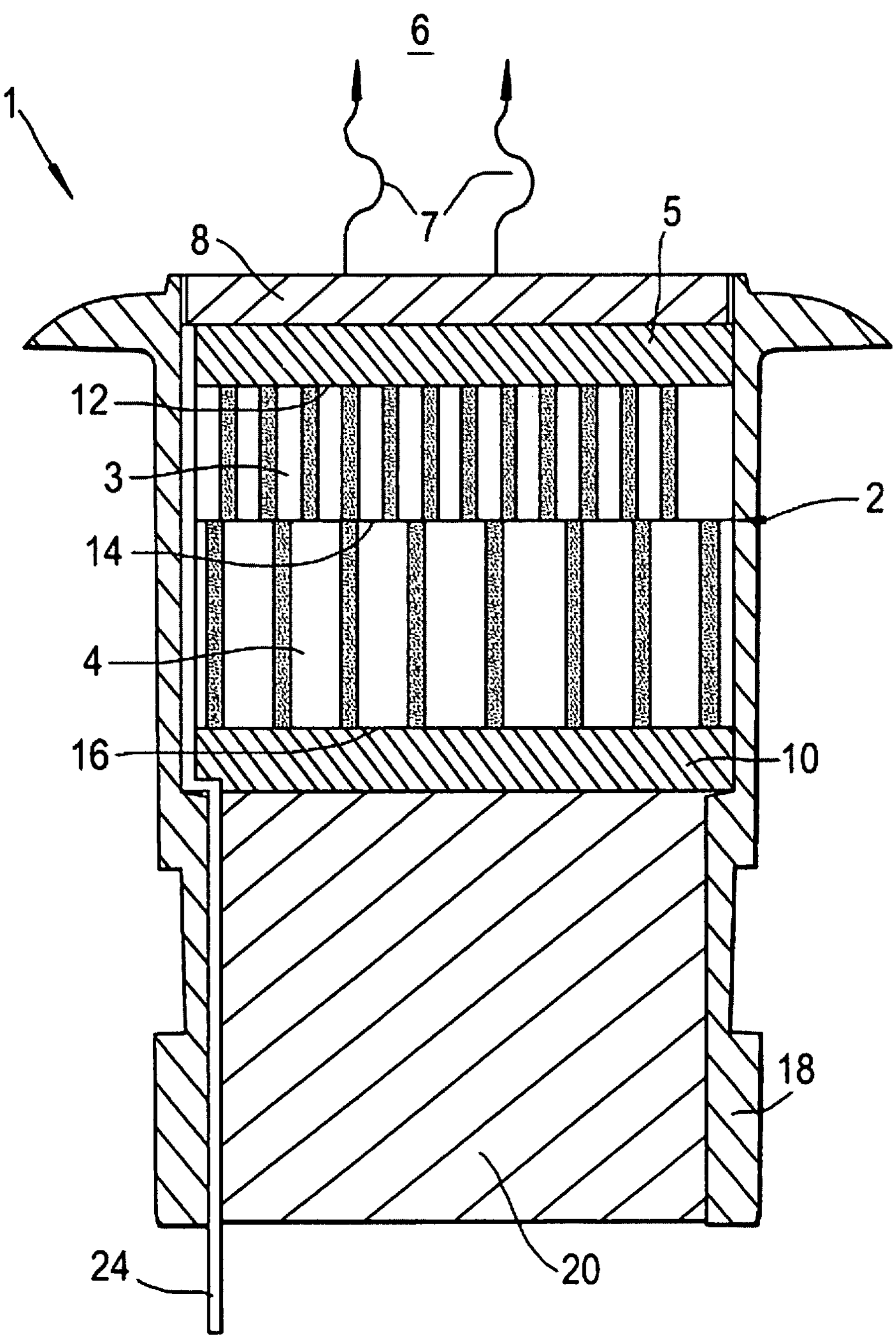

FIG. 2 shows an apparatus 1 for use in SONAR applications showing a vibrator body 2 comprising a first 3 and a second 4 part for generating and/or receiving ultrasonic or acoustic waves. The particular apparatus is not restricted to SONAR applications and can be used in other applications that utilises transducers for generating and/or receiving ultrasound or acoustic waves. In the particular embodiment, the first and second part is a first and second composite material comprising a combination of a material for generating and/or receiving ultrasonic/acoustic waves and a passive material and formed as a single piece. In the particular embodiment, the composite is a piezocomposite comprising a piezoelectric ceramic material and a passive non-piezoelectric material. The piezoelectric material (PZT) can be selected from the group of piezoelectric materials consisting of but not limited to Navy Type I (PZT4D), Navy Type II (PZT5A), Navy Type III (PZT8), Navy Type IV (Barium Titanate), Navy Type V (PZT5J), Navy Type VI (PZT5H) or single crystal materials, for example but not limited to PMN-PT28 or PMN-PT30. The composite is not restricted to piezoelectric materials and other materials for generating and/or receiving ultrasonic/acoustic waves are applicable such as magnetostricitve materials or electrostrictive materials. The passive non-piezoelectric material can be a polymer such as an epoxy resin or air. The use of composites, e.g. piezocomposites, offers the user with the flexibility to control the acoustic impedance and/or resonant frequency of the material so that it can be acoustically matched or even close to that of the medium or load under investigation, e.g. water in SONAR applications and tissue in ultrasonic imaging applications. In accordance with equation 8, the resonant frequency of the piezocomposite material varies with the geometry of the piezocomposite material. In this context, geometry encompasses the shape, size or anyone of the physical dimensions such as the thickness of the part. Whilst the resonant frequency varies with the geometry of the part such as the thickness, the acoustic impedance of the material can be varied by varying the relative proportion of the piezoelectric material and the passive non-piezoelectric material or density of the part (equation 1). A number of techniques known in the art are available to vary the relative proportions of the piezoelectric material and the passive non-piezoelectric material ("The Role of Piezocomposites in Ultrasonic Transducers", Wallace Arden Smith, IEEE Proceedings of the Ultrasonic Symposium 1989, pp. 755-766). Techniques include laying PZT rods parallel to each other in a polymer matrix and then slicing off discs perpendicular to the rods. In the particular embodiment, the composites were prepared using the 'dice and fill' technique whereby grooves are cut into the piezoelectric ceramic to create upstanding rods or 'pillars' in the ceramic and a polymer material (e.g. epoxy, or polyurethane, syntactic polymer or thermoplastic) is cast into the grooves. In essence, the greater proportion of the piezoelectric ceramic material to the passive material, the greater the density and thus, the acoustic impedance of the composite material. For the case where the composite material is formed by suitably arranging rods of the material in a polymer and then slicing off disks perpendicular to the rods, the density can be varied by varying the diameter of the rods. In the case of the 'dice and fill' technique, the density can be varied by varying the size of the 'pillars' cut out into the block piezoelectric ceramic. The composition of the composite material and thus, density can also be varied by the choice of the passive material, In the particular embodiment, the epoxy used is traded under the name EPO-TEK 301-2 manufactured by Epoxy Technologies, Inc. and is mixed with Expancel plastic microspheres manufactured by Akzonobel. By varying the proportion or volume fraction of the piezoelectric material and polymer in the composite, the acoustic impedance can be varied from 4 MRayls up to 28 Mrayls. However, bulk piezoelectric or magnetostrictive or electrostrictive materials with the desired acoustic impedance and resonant frequency could equally be used. For example, the acoustic impedance of bulk PZT ranges from 33 Mrayls for Navy Type I (PZT4D) material down to 29 Mrayls for Navy Type VI (PZT5H) material.

The acoustic impedance of the vibrator body is acoustically matched into water having an acoustic impedance of 1.48 Mrayls. A front matching layer 5 satisfying equation 6 is disposed between the first composite material 3 and the medium 6. The waves 7 excited from the vibrator body propagate towards the front and back directions of the vibrator body. A backing layer 10 is located at the rear of the vibrator body. The acoustic impedance of the backing layer is chosen so that it functions to absorb the acoustic or ultrasonic waves from the vibrator body. In order for the backing layer 10 to behave as an absorber, its acoustic impedance is chosen so that it is equal to the acoustic impedance of the vibrator body or within half an order of magnitude. With reference to the vibrator body shown in FIG. 2, the acoustic impedance of the backing layer is chosen so that it is equal to the acoustic impedance of the second part 4. Theoretically, the acoustic waves travelling towards the backing layer are not reflected at the rear side of the vibrator body and a majority of the backward wave energy is absorbed in the backing layer 10. However, despite the backing layer 10 having an acoustic impedance geared to absorb the backward waves, there may be incidents whereby a portion of the ultrasonic waves escape through the backing material and reflect from any part of the housing, thereby raising the risk of the returning reflected wave travelling through the backing layer and interfering with the drive or receiving signal of the transducer. To limit the effects of the reflection wave interfering with the drive signal or the receiving signal, the thickness or the material type of the backing layer is chosen so as to delay the returning reflected wave from interfering with the drive or receiving signal to an extent that any of the reflected wave that passes through the vibrator body occurs after the transducer has generated or received the acoustic signal. In order for the backing layer to function to delay the reflected layer from interfering with the drive or receiving signal, the thickness and/or the acoustic impedance of the backing layer is made such that the returning reflective waves approaches the transducer after the transducer has generated and/or received the acoustic signal. In terms of the wavelength of sound in the backing layer, the thickness of the backing layer L to delay the reflected wave from interfering with the drive or receiving signal of the transducer is derived as set out below and by reference to the schematic diagram shown in FIG. 11.

Consider the vibrator body being driven a total number of n cycles and a rearward travelling wave travels a distance d through the backing layer 10, which corresponds to the path 22 (see FIG. 11). The length L of the backing layer must be at least half the travelling distance d of the wave:—

$$L=d/2 \tag{13}$$

The distance the wave will travel is proportional to the velocity of sound in the backing layer material, v, and the time, t, that the transducer is driven and can be expressed by the equation:—

$$d=v\times t \tag{14}$$

Substituting equation 13 into equation 14 gives:—

$$L=v\times t/2 \tag{15}$$

The length of the backing layer L must be selected so that the time for the reflected wave to travel to the transducer is longer than the time t the transducer is driven. The time it takes to drive the transducer t for a number of cycles n is given by:—

$$t=nT \tag{16}$$

where T is the time for one period of oscillation of the transducer at the frequency, f and since:—

$$T=\frac{1}{f} \tag{17}$$

Substituting equation 17 into equation 16 then:—

$$t=\frac{n}{f} \tag{18}$$

As the frequency of the transducer can be expressed by the equation below:—

$$f=v/\lambda \tag{19}$$

where λ is the wavelength of sound in the backing material, then substituting equation 19 into equation 18, the time t can be expressed in terms of the wavelength of sound in the backing layer:—

$$t=n\lambda/v \tag{20}$$

Thus by substituting the time given in equation 20 into equation 15, the length of the backing layer L can be expressed in terms of the wavelength of sound in the backing layer. Thus, to separate the acoustic signal emitted into the backing layer from the drive or receive signal, the thickness of the backing layer is ideally given by:—

$$n\lambda/2 \tag{21}$$

where n is the number of cycles bursts of the transducer, where each cycle burst of the transducer represents the period of oscillation of the transducer and λ is the wavelength of sound in the backing layer.

For example, considering driving the transducer with up to a 10 cycle burst, each cycle representing the period of vibration of the transducer, then to limit interference with the drive or receiving signal the length of the backing layer should be 10×λ/2. The backing material includes but not limited to air-like materials such as cork, polyurethane foam or sonite. The use of air-like backing material provides the added advantage of improved sensitivity over absorbing backings, since the reverberating signal is used to increase the output from the front face of the transducer closest to the medium under investigation. Due to space constraints it is often difficult to use an absorbing backing material at low frequencies, since the wavelength becomes longer, and to separate the drive signal from the absorbed signal requires an increasingly large transducer. In comparison to air like materials, an absorbing backing material is used if wide bandwidth is required. Acoustic impedance determines whether a material is air like or absorbing. A good backing layer for a composite is 25% volume fraction silicon carbide loaded epoxy such as ER2188 from Electrolube. This will have an acoustic impedance of about 10 MRayls, but the volume fraction of silicon carbide can be selected to match appropriately.

Alternatively or in addition to having an absorptive backing layer that functions to delay the returning reflected wave from reaching the transducer, the backing layer can also function to diffract the waves away from the transducer. One way to diffract the acoustic waves away from returning into the vibrator body is to form the backing layer as a serrated layer.

The respective surface of the first 3 and second 4 composite layers are coated with a conductive material as is commonly known in the art (e.g. a metallic coating), e.g. by means of screen printing silver loaded epoxy or sputter coating. Typical coating materials include but not limited to silver loaded conductive epoxy resin, nickel, silver, gold, or copper. Electrical connections 12, 14, 16 in the form of electrically conductive tethers are respectively made between the top and bottom surface of the first composite material 3 and between the top and bottom surface of the second composite material 4 (see FIG. 2). The electrical connections 12, 14, 16 are threaded around the outside of the vibrator body towards the rear of the apparatus for connection to a suitable voltage supply 24. In the particular embodiment shown in FIG. 2, the composite layers 3 and 4 are arranged such that they are mechanically connected in series and connected electrically in parallel. However, it is permissible to electrically connect the composite layers in series.

The vibrator body together with the matching layer and the backing layer is securely housed in an outer casing 18 and made waterproof by means of a front waterproof sealing layer 8 located adjacent the matching layer and a back waterproof sealing layer 20 located adjacent the backing layer 10. The front sealing layer is made acoustically transparent having an acoustic impedance close to that of the medium under investigation. In the case of underwater SONAR applications, the acoustic impedance of the sealing layer is close to that of water. In addition to being acoustically transparent to the medium, the material of the sealing layer must be able to withstand long term exposure to the medium, in this case water or seawater. Typical materials for use as the front and back sealing layer comprise a polyurethane material with long term sea water resistance. For underwater SONAR applications, the material for the front sealing layer includes but is not limited to EL230C Polyurethane manufactured by Robnor Resins Ltd. Other sealing materials include materials, for example, from Electrolube (www.electrolube.com). By having the appropriate acoustic impedance, the back sealing layer 20 can also function to absorb the acoustic waves from the vibrator body and in one embodiment, the back sealing layer can even replace the backing layer 10. Moreover, the thickness of the back sealing layer can made to satisfy equation 13 above so as to present a delay to any returning reflected waves and thereby, prevent the reflected waves from interfering with the drive or receiving signal.

It is imperative that the surfaces of the matching layer, the first and the second composite materials are in intimate contact with each other to facilitate transmission of the acoustic waves through the frontface of the transducer (through the matching layer 5 and front sealing layer 8); otherwise it will affect the performance of the transducer into the medium under investigation. The present applicant has found that the use of epoxy resins to bond the matching layer to the composite materials can be problematic due to the fact that for a porous matching layer, the resin has a tendency to be absorbed within the pores of the material of the layer and thereby affecting its acoustic impedance value. As a result, there is a reluctance to the use of epoxy resins to bond these layers in a transducer. This is particularly the case for bonding of carbon or graphite type materials forming the matching layer. However, the present applicant has realised that the choice of the epoxy resin having an acoustic impedance similar to that of the material to which it is bonded to is important to mitigate these effects. For example, for the case of bonding a carbon or graphite matching layer, the present applicant has realised that the use of an epoxy resin to bond the matching layer having an acoustic impedance similar to that of carbon or graphite would not greatly affect the overall acoustic impedance of the matching layer despite being absorbed into the matching layer. For the case of bonding carbon or graphite material, the present applicant has realised that Stycast 2850FT, manufactured by Emerson and Cumings Polymers Encapsulants provides adequate bonding of the matching layer without greatly affecting the acoustic impedance of the matching layer.

The surfaces of the conductive coatings can optionally be etched or 'roughened' in order to provide sufficient 'keying' of the resin material.

Figure 3A:
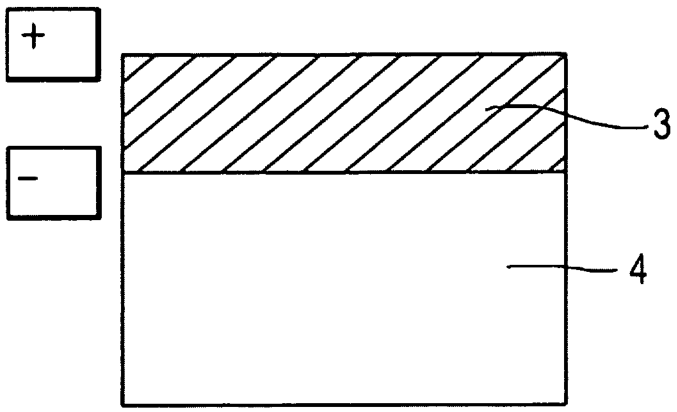
FIG. 3 is a perspective view of the different frequency modes of the transducer in FIG. 2.
Figure 3B:
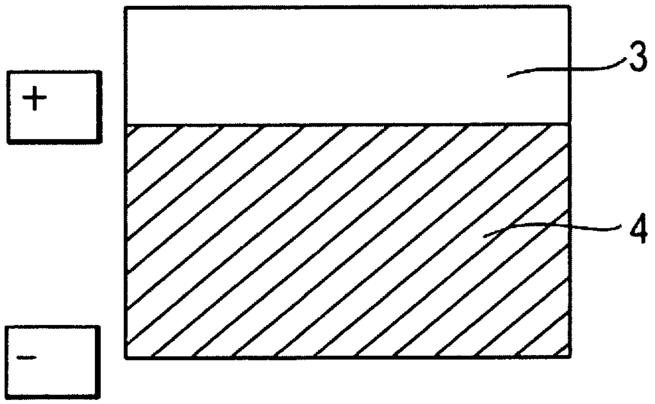
Figure 3C:
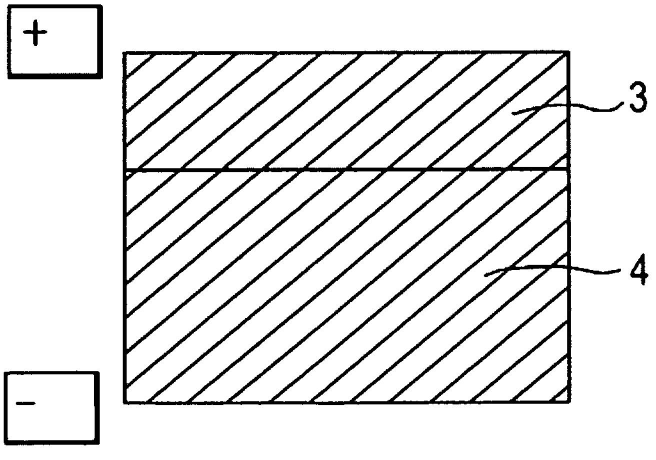

In the different embodiments of the present invention, the different frequency modes of operation provided by the arrangement of the first and second piezocomposite materials are shown in FIG. 3(*a, b, c*). In the first embodiment of the present invention described above and shown in FIG. 2, the different frequency modes given by the arrangement of the vibrator body shown in FIG. 2 is shown in FIG. 3*a* and FIG. 3*c*. FIG. 3*a* represents the first frequency mode associated with the first piezoelectric material 3, and FIG. 3*c* represents the second frequency mode associated with the combination of the first and second piezoelectric material. The frequency of operation given by the first and second frequency modes will be dependent upon the frequency by which the first, or the combined first and second composite materials are made to resonate respectively. The acoustic impedance and, the anti-resonant/resonant frequency of the first and the second piezocomposites can be tailored so as to allow the transducer to operate over two frequency modes given by FIGS. 3*a* and 3*c* respectively. For example, the anti-resonant/resonant frequency and the acoustic impedance of the first piezocomposite can be chosen so that the matching layer acoustically matches the first piezocomposite over a low frequency in the first frequency mode (given by FIG. 3*a*) whereas the medium to high frequency can be provided by choosing the combination of the first and second piezocomposite to resonate at the medium to high frequency in the second frequency mode (given by FIG. 3*c*). There is no restriction as to whether the low or medium or high frequency range is provided by either the first piezocomposite or the combination of the first and second piezocomposite. The use of piezocomposites over conventional bulk piezoelectric materials allows the acoustic impedance and the anti-resonant/resonant frequency to be easily tailored to the desired frequency by varying its composition or 'geometry' respectively as discussed above. However, this is not to say, that conventional bulk piezoelectric materials possessing the desired resonant frequency can be used. Typically the lower frequency ranges is dependent upon the ability to pole thicker blocks of the material for receiving and/or generating ultrasonic/acoustic waves and the availability of new materials. In terms of the composite materials, the highest possible frequency is dependent upon the ability to cut the composite with precision which in turn is dependent upon the machining tolerances. In addition to varying the resonant frequency of the piezocomposite material, the acoustic impedance of the composite is dependent upon the ability to machine the material making up the composite with precision, e.g. using the dicing technique. Generally, mechanical dicing saws are quite effective for rod scales ranging down to fifty microns and below this has become increasingly difficult as the generated rod are very fragile and the availability of cutting tools (saw blades) with the appropriate cutting dimensions ("The Role of Piezocomposites in Ultrasonic Transducers" by Wallace Arden Smith, IEEE Proceedings of the Ultrasonic Symposium, 1989, pp. 755-766). Recently, it has been known that finer precision cutting can be achieved using laser cutting or chemical etching methods, e.g. laser ablation.

Below describes two embodiments of the present invention to selectively match the acoustic impedance given by the first part/piezocomposite material, the second part/piezocomposite material and the combination of the first and second part/piezocomposite material as shown in FIGS. 3*a*, 3*b* and 3*c* into a load, e.g. water.

In the first embodiment of the present invention, the acoustic impedance of the first and second piezocomposite is tailored so that the quarter wavelength thickness of the matching layer given by equation 6 associated with the first piezocomposite material (FIG. 3*a*) is substantially an odd multiple of the quarter wavelength thickness of the matching layer associated with the combined first and second piezocomposite (FIG. 3*c*). In terms of equation 6, by substantially selecting odd frequencies, a $n\lambda/4$ matching layer thickness at one frequency mode is equal to a $n\lambda/4$ matching layer thickness in another frequency mode, where n is substantially an odd number (1, 3, 5 . . . ). For example, the matching layer thickness of $3\lambda/4$ at one frequency mode given by the arrangement of the first frequency mode shown in FIG. 3*a* is equal to $1\lambda/4$ at another frequency mode given by the arrangement of the second frequency mode shown in FIG. 3*c* and thereby n is equal to 3 and 1 respectively. Thus, if the first and second frequency mode covers the low frequency and high frequency range respectively; then the first and the second piezocomposite can be tailored to provide the low and high frequency range that can be effectively matched into the medium by arranging the acoustic impedance and the anti-resonance/ resonance frequency of the first and second piezocomposites so that they are selectively matched by a single matching layer. According to equation 7 the wavelength of the sound in the matching layer, λ, is proportional to the anti-resonance frequency of the vibrator body that is matched into the medium, then it follows that the first piezocomposite has an anti-resonance frequency at a first anti-resonance frequency and the combined first and second piezocomposite has an anti-resonance frequency at a second anti-resonance frequency. Thus, having a matching layer with a thickness equal to $$\frac{\lambda}{4}$$

for the combined first and second piezocomposite and 3λ/4 for the first piezocomposite alone, then it follows that to acoustically match the vibrator body in the first and second frequency modes given by FIGS. 3*a* and 3*c*, the first anti-resonance frequency would be substantially an odd multiple of the second anti-resonance frequency. To further increase the bandwidth according to equations 4 and 5, a second matching layer can be used in addition to the first matching layer to provide a double matching layer for the first and second piezocomposites. A typical example of single and double matching the acoustic impedance of a first piezocomposite material coupled to second piezocomposite according to an embodiment of the present invention is described in Examples 1 and 2 below.

Figure 4:
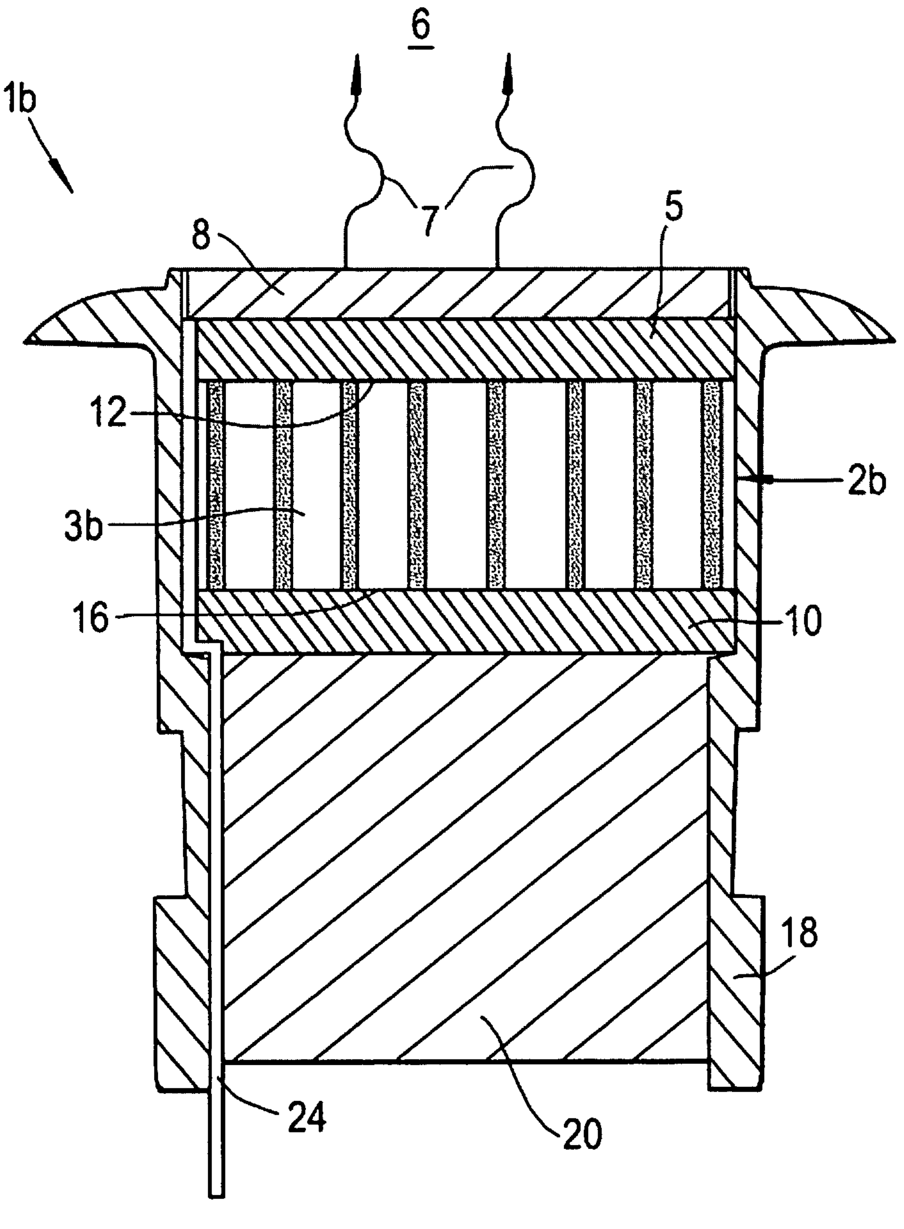
FIG. 4 is a perspective view of an apparatus comprising a transducer according to the first embodiment of the present invention showing a second arrangement of the vibrator body comprising a single part and a matching layer.

An alternative arrangement of the transducer apparatus 1*b* of the first embodiment of the present invention, more particularly of the vibrator body, is shown in FIG. 4. Instead of the vibrator body 2 comprising a first part 3 and a second part 4, the vibrator body 2*b* in FIG. 4 comprises a single part 3*b*. Unlike FIG. 2, where the different frequency modes of the vibrator body is provided separately by a first part and a second part, in the alternative arrangement of the present invention the different frequency modes of the vibrator body 2*b* is provided by the same part 3*b* forming the vibrator body 2*b* (see FIG. 4). The different frequency modes of the vibrator body are provided by the different modes of vibration of the vibrator body, i.e the part forming the vibrator body. The use of the different modes of vibration of the same part forming the vibrator body has the advantage of fabricating the transducer even smaller than in the first arrangement comprising multiple parts. More particularly, the first frequency mode and the second frequency mode are provided by a first and second vibration mode of the same part 3*b* forming the vibrator body 2*b*, each vibration mode having its own characteristic resonance and anti-resonance frequency. For example, for a disc shaped part forming the vibrator body the first frequency mode can be along the thickness direction 30*a* (see FIG. 5*a*) and the second frequency mode can be along the radial direction 30*b* (See FIG. 5*b*). This part could be a bulk material for generating and/or receiving acoustic or ultrasonic waves or a composite material as discussed above. The remaining features shown in FIG. 4 including the electrical connections 12, 16 (excluding the electrical connection 14 between adjacent coupling parts) are the same and will have the same reference numbers as in the first arrangement of the vibrator body shown in FIG. 2. Moreover, the function of the backing layer in FIG. 4 is the same as that described for FIG. 2. However, in contrast to the first arrangement of the vibration body shown in FIG. 2, the acoustic impedance of the backing layer 10 is substantially equal to the acoustic impedance of the part 3*b* forming the vibrator body 2*b*, to substantially prevent the acoustic or ultrasonic waves from being reflected back into the vibrator body.

Figure 6A:
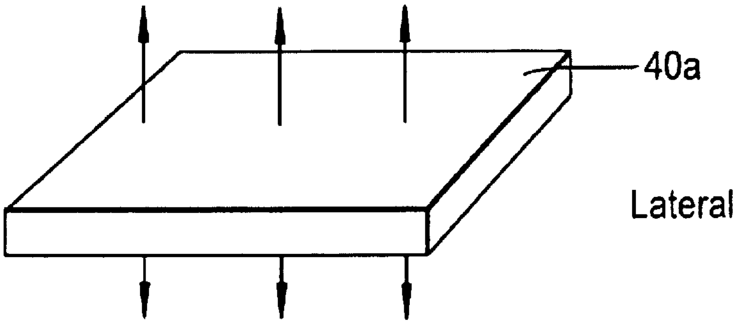
FIGS. 6(*a* and *b*) shows the different modes of vibration of the vibrator body in the shape of a plate.
Figure 6B:
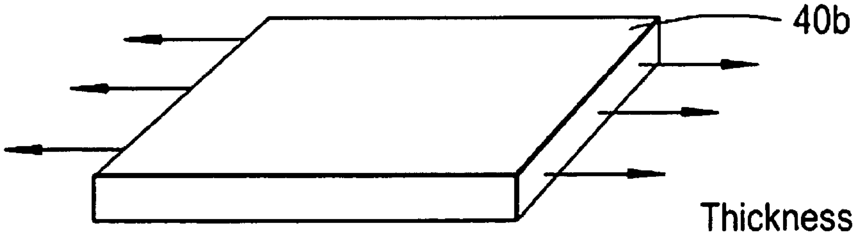

It is well known in the art that a material for generating and/or receiving acoustic or ultrasonic waves such as a piezoelectric or magnetostrictive or electrostrictive material have multiple modes of vibration in a single part due to its particular geometry. Depending upon the geometry of the part, the mode of vibration can be along anyone of its axis such as along the radial direction, lateral direction and/or the thickness direction. For example, a part shaped in the form of a disc would have modes of vibration along the radial direction and the thickness direction. A part in the shape of a tube would have mode of vibration along the length of the tube, along the wall thickness of the tube and the circumferential (hoop) direction. Likewise, a part in the shape of a sphere has modes of vibration along the radial direction and along the wall thickness of the part. A part in the shape of a plate would have modes of vibration along the thickness 40*a* and the length 40*b* of the plate (see FIGS. 6*a* and 6*b*).

Figure 1:
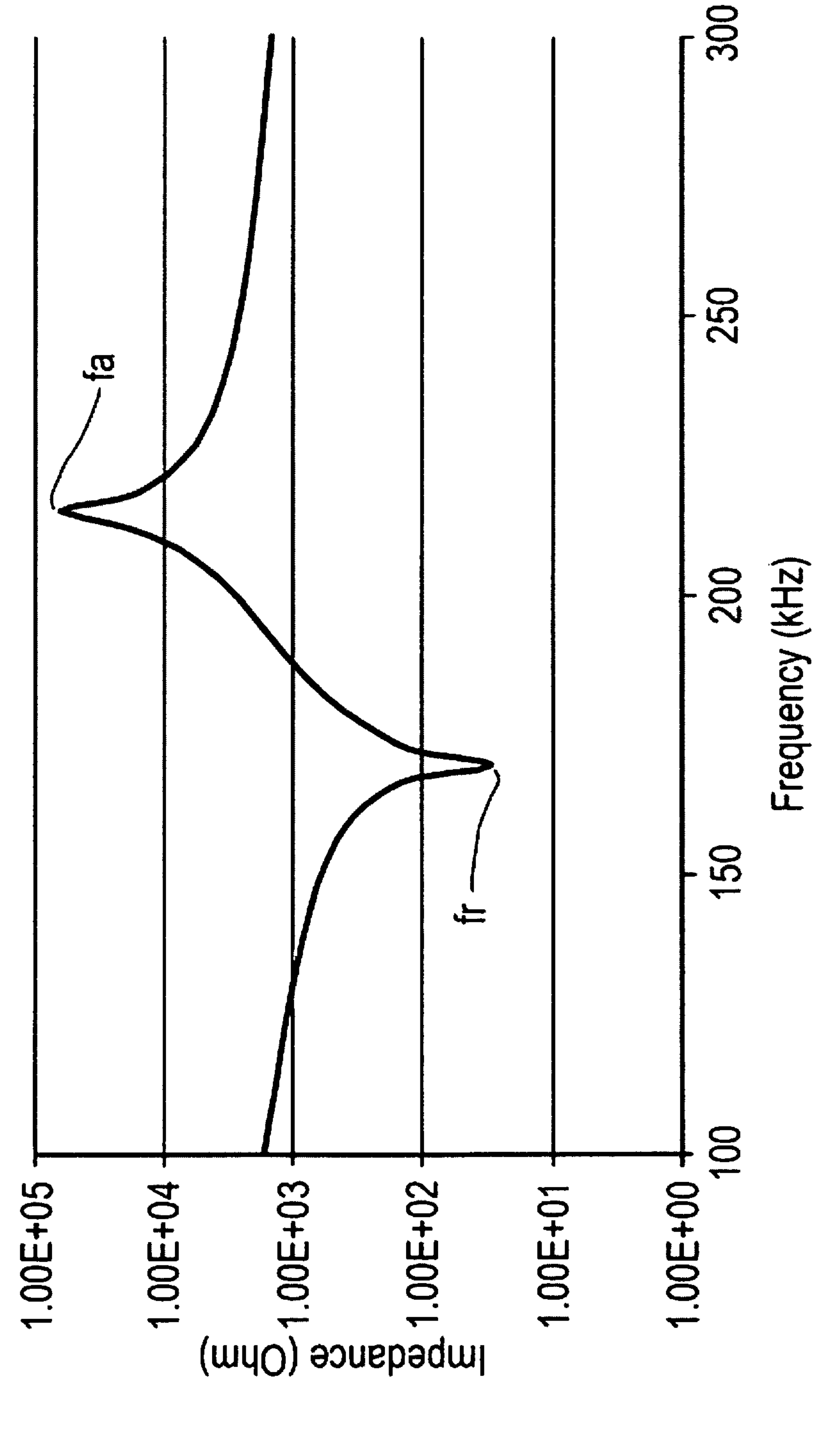
Figure 8A:
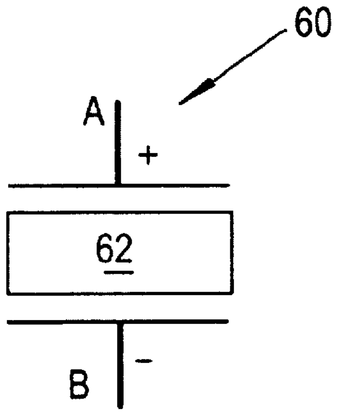
FIGS. 8(*a* and *b*) is a schematic representation of an equivalent electrical circuit diagram for a piezoelectrical resonator.
Figure 8B:
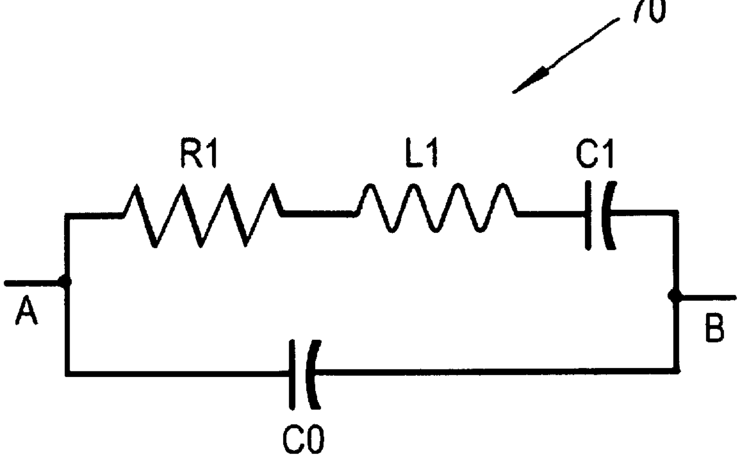

FIG. 9 is a plot showing the relationship between the electrical impedance of a single bulk piezoelectric part 62 in the shape of a disc being driven at different frequencies. The impedance, Z (ohm) across a material 60 for generating and/or receiving acoustic or ultrasonic waves (A-B in FIG. 8*a*) can be equivalent to the electrical impedance across an electrical equivalent circuit 70 (A-B) shown in FIG. 8*b*. In FIG. 8*b* R1 represents a resistive component of the transducer, L1 represents the inductive component of the transducer, C1 represents the capacitive component of the transducer and Co is the motional capacitance of the transducer. As well understood in the art, the electrical impedance has an imaginary component and a real component. Referring to FIG. 8*b*, the real component is associated with the resistance of the circuit 70 and the imaginary component is associated with the capacitance of the circuit 70. The axis theta (θ) in the plot shown in FIG. 9 represents the phase angle between the real part of the impedance and the imaginary part of the impedance. In comparison to the plot in FIG. 1 which only covered a small frequency range, at a greater frequency range shown in FIG. 9, multiple vibration modes are clearly shown, each vibrational mode providing a different resonant/anti-resonant frequency. The characteristic resonance and anti-resonance peaks shown in FIG. 1 representing the region of minimum impedance (resonance frequency) and maximum impedance (anti-resonance frequency) can be seen numerous times in FIG. 9. The first characteristic resonance/anti-resonance peaks represents the second mode of vibration along the radial direction of the disc (FIG. 5*b*) and the second characteristic resonance/anti-resonance peaks represents the first mode of vibration along the thickness of the disc (FIG. 5*a*) according to the present invention. According to FIG. 9, the mode of vibration along the radial direction of the disc has a resonance frequency at around 52.75 kHz and an anti-resonance frequency at around 60.35 kHz. At higher frequencies, there is a vibration along the thickness of the disc having a resonance frequency at around 158 kHz and an anti-resonance frequency at around 176.25 kHz. The additional peaks at 162.95 kHz and 173.4 kHz between these peaks are attributed to harmonic interference which will be discussed below.

Thus according to the present invention, the ratio of the anti-resonance frequency associated with the first vibration mode along the thickness direction (FIG. 5*a*) and the second vibration mode along the radial direction (FIG. 5*b*) is thus given by:—

$$fa(\text{thickness})/fa(\text{radial})=176.25/60.35=2.92 \qquad (22)$$

Taking into the account the experimental errors, a ratio of 2.92 can be approximated to an odd number within the present invention, e.g. within an experimental error of 10%. Thus the acoustic impedance of the matching layer can be engineered having a $3\lambda/4$ thickness for the first vibration mode and a $\lambda/4$ thickness for the second vibration mode so as to acoustically match the acoustic impedance of the piezoelectric part into the medium, thereby providing a dual frequency transducer.

Taking the ratio of the anti-resonance, fa, and the resonance frequency, fa, to be approximated to a constant then for the thickness vibration mode, the ratio of the anti-resonance frequency and the resonance frequency is:—

$$fa(\text{thickness})/fr(\text{thickness})=176.25/158.2=1.11 \quad (23)$$

where fa(thickness) is the anti-resonance frequency of the thickness mode of vibration and fr(thickness) is the resonance frequency of the thickness mode.

For the radial vibration mode, the ratio of the anti-resonance frequency and the resonance frequency is:—

$$fa(\text{radial})/fr(\text{radial})=60.35/52.75=1.144 \quad (24)$$

Substituting for fa(thickness) and fa(radial) from equations 23 and 24 into equation 22, the ratio of the resonance frequencies associated with the first vibration mode along the thickness direction and the second vibration mode along the radial direction is thus given by:—

$$fr(\text{thickness})/fr(\text{radial})=2.92\times1.144/1.11=3.01 \quad (25)$$

Thus, using the resonance frequencies as opposed to the anti-resonance frequencies can be approximated to an odd number taking into account experimental errors. Thus driving the piezoelectric disc throughout these frequency ranges will result in a first resonance/anti-resonance frequency associated with one mode of vibration and a second lower resonance frequency/anti-resonance frequency associated with another mode of vibration. In the particular example shown in FIG. 9, the first mode of vibration is associated with the thickness mode of vibration and the second mode of vibration is associated with the radial mode of vibration. The equations shown in Eq. 22 to 25 can be applied for the first arrangement of the vibrator body shown in FIG. 2, whereby the first anti-resonance/resonance frequency is provided by the first part (FIG. 3*a*) and the second anti-resonance/resonance frequency is provided by the combined first and second part (FIG. 3*c*).

Figure 5A:
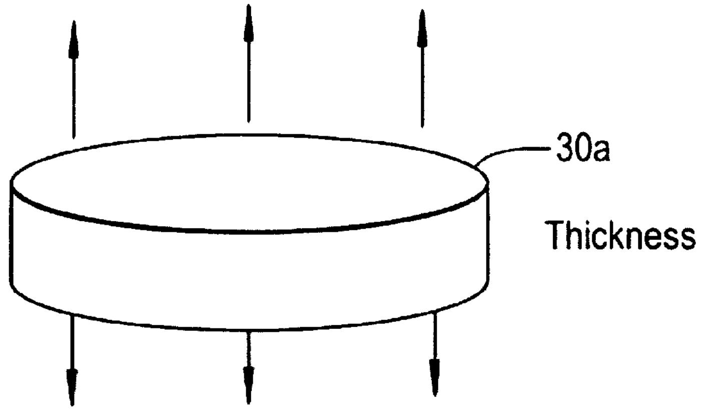
FIGS. 5(*a* and *b*) shows the different modes of vibration of a vibrator body in the shape of a disc.

As with the two-part vibrator body shown in FIG. 2, the acoustic impedance of the part forming the vibrator body shown in FIG. 4 can be chosen so as to be acoustically matched into the medium by the matching layer. However, whereas in the first arrangement shown in FIG. 2 the matching layer acoustically matches the first part 3 in the first frequency mode (see FIG. 3*a*) and the combination of the first and second part in the second frequency mode (see FIG. 3*c*), the matching layer acoustically matches the vibrator body at the different modes of vibration of the same part (e.g. a first mode of vibration giving a first frequency mode and a second mode of vibration giving a second frequency mode). In FIG. 5*a* the first vibration mode is associated with the thickness mode of vibration in a first frequency mode and the second vibration mode is associated with the radial mode of vibration (FIG. 5*b*) in a second frequency mode. Thus, according to the plot shown in FIG. 9, by effectively matching the piezoelectric plate into the medium, the transducer can cover a large frequency bandwidth determined by the resonance frequency of the first and second modes of vibration of the part forming the vibrator body, in this case 176 kHz and 52 kHz.

For ease of explanation, the terms; frequency mode, resonance frequency and anti-resonance frequency are used in both arrangements of the vibration body, i.e. whether in relation to the first part or the second part in the arrangement of the vibrator body shown in FIG. 2 or a first mode of vibration or second mode of vibration of the same part in the arrangement of the vibrator body shown in FIG. 4. For example, in the arrangement shown in FIG. 2, the first frequency mode shown in FIG. 3*a* is provided by the first part 3 and the second frequency mode shown in FIG. 3*c* is provided by the combination of the first part acoustically coupled to the second part 4. Likewise, in the second arrangement of the vibrator body, the matching layer matches the first vibration mode of a vibrator body at a first frequency mode and the second vibration mode at a second frequency mode, the first vibration mode being anyone of the radial, lateral or thickness or width vibration mode of the part and the second vibration mode being anyone of the radial, lateral or thickness width vibration mode of the same part. This is largely depending upon the shape of the part forming the vibrator body.

In the first arrangement of the first embodiment of the present invention, the acoustic impedance of the first part and second part is tailored so that the quarter wavelength thickness of the matching layer given by equation 6 associated with the first part (FIG. 3*a*) is substantially an odd multiple of the quarter wavelength thickness of the matching layer associated with the combined first and second part (FIG. 3*c*), i.e. a matching layer thickness of $n\lambda/4$ at one frequency mode for the first part (FIG. 3*a*) and a $n\lambda/4$ matching layer thickness at another frequency mode for the combined first and second part shown in FIG. 3*c* where n is substantially an odd number (1, 3, 5 . . . . ). The same principle can be applied to the second arrangement of the vibrator body but instead of the first and second frequency mode being a first part and the combined first and second part respectively, applying the quarter wavelength thickness of the matching layer to the first vibration mode and the second vibration mode of the same part. Thus, the acoustic impedance of the part forming the vibrator body is tailored (e.g. composition or type) so that the quarter wavelength thickness of the matching layer given by equation 6 associated with the first vibration mode of the part is substantially an odd multiple of the quarter wavelength thickness of the matching layer associated with the second mode of vibration of the same part. In terms of equation 6, by selecting odd frequencies, a $n\lambda/4$ matching layer thickness at one frequency mode is equal to a $n\lambda/4$ matching layer thickness in another frequency mode, where n is substantially an odd number (1, 3, 5 . . . . ). For example, the matching layer thickness of $3\lambda/4$ at a first frequency mode given by the first vibration mode of the part is equal to $\lambda/4$ at another frequency mode given by the second vibration mode of the same part and thereby n is equal to 3 and 1 respectively. As with the first arrangement of the vibrator body shown in FIG. 2, to further increase the bandwidth according to equations 4 and 5, a second matching layer can be used in addition to the first matching layer to provide a double matching layer for the first vibration mode and the second vibration mode of the same part.

Referring back to the plot shown in FIG. 9, in addition to the characteristic resonance/anti-resonance frequency peaks associated with the radial and thickness mode of vibration, a number of smaller peaks at frequencies other than the resonance/anti-resonance frequency of the radial and thickness mode of vibration are also present. These are attributed to the modes of vibration in the other directions of the vibrator body besides the radial and thickness direction in addition to the harmonics associated with them and the harmonics associated with the radial or thickness fundamental frequency or the harmonics associated from a combination of them. Typically a 3-dimensional part will vibrate in all three directions, along the x, y and z axis, each having different modes of vibration at different resonance/anti-resonance frequencies respectively. The resonance and anti-resonance frequency of the disc along the radial mode represents the fundamental frequencies associated with the resonance and anti-resonance frequency respectively along the radial direction. Likewise, the resonance and anti-resonance frequency of the disc along the thickness mode represents the fundamental frequencies associated with the resonance and anti-resonance frequency respectively along the thickness direction. However, the other mode of vibration along the other axis will also result in a different resonance and anti-resonance fundamental frequency. This is typical of a material for generating and/or receiving ultrasonic or acoustic waves such as a piezoelectric, magnetostrictive or electrostrictive material. As there are at least three modes of vibration of a part along the x, y and y axis, anyone of the modes of vibration along the x, y and z axis can be used in the present invention. Which of the two modes of vibration are chosen is dependent upon their respective resonance/anti-resonance frequency that satisfies the present invention (being substantially an odd multiple) and the frequencies of interest. It is also permissible to tailor the acoustic impedance of the part forming the vibrator body and/or the acoustic impedance of the matching layer so that the vibrator body is effectively matched into the medium at all three modes of vibration along the x, y, and z axis, giving a tri-frequency transducer. A typical example of single and double matching the acoustic impedance of the different vibrational modes of a part forming the vibrator body of the present invention is described in Example 3 and 4.

Figure 7:
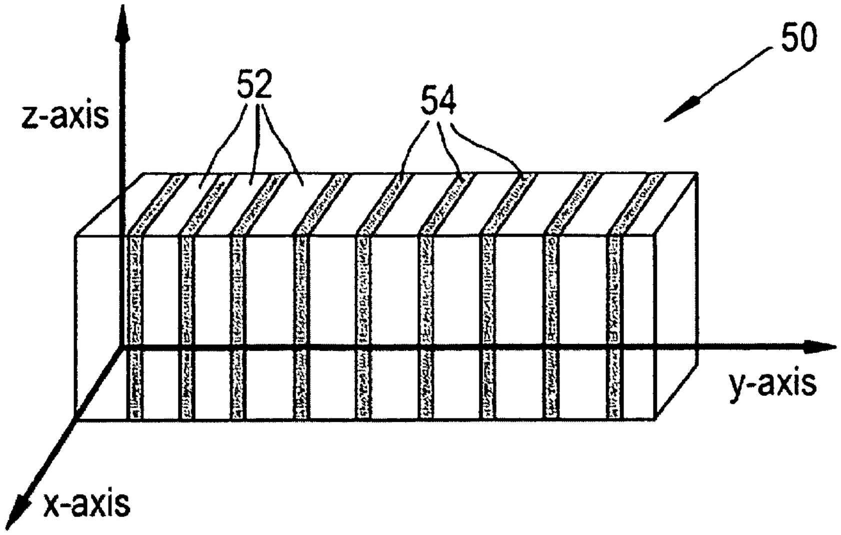
FIG. 7 shows the arrangement of the 2-2 composite structure of the vibrator body.

As discussed above, by forming the bulk material for generating and/or receiving acoustic waves into a composite and depending upon the structure of the composite material or how it is diced, anyone one of the modes of vibration along the x or y or z axis can be suppressed so that the performance in the other two directions (e.g. bandwidth) significantly improves. This can be explained by the ability of the material for generating and/or receiving acoustic waves in the composite structure to bulge against its surroundings without any constraints. As the material for generating and/or receiving acoustic or ultrasonic waves is usually a hard ceramic material and the polymer material is soft, then the ceramic material can bulge at the sides and compress the soft, light polymer, the soft polymer effectively "absorbing" the bulges of the ceramic. This is different when surrounded by ceramic, as it is tightly confined against the surrounding ceramic. This is exacerbated if the surrounding ceramic material is also undergoing the same dimensional shifts. The different vibrational modes of the composite material can be controlled by varying the structure of the composite material so as to improve the modes of vibration along two axes and suppress the mode of vibration along the other axis. This results in a composite material having a vibrational mode at one frequency mode and another vibrational mode at another frequency mode of interest. The structure being the arrangement of the material for generating and/or receiving acoustic or ultrasonic waves with respect to the polymer material and how they interact with each other. One way of suppressing the mode of vibration in one axis is by forming the composite structure into alternate layers of material for generating and/or receiving acoustic or ultrasonic waves and polymer, e.g. dicing in one direction. FIG. 7 shows a 2-2 composite structure which is so named because both the material for generating and/or receiving acoustic waves, e.g. ceramic, and the polymer are continuous in two dimensions with the lengths of the material for generating and/or receiving acoustic or ultrasonic waves and the polymer arranged in parallel. This can be illustrated with reference to the axes shown in FIG. 7, by forming the composite with a 2-2 composite structure, the mode of vibration along the lateral direction along the y-axis is suppressed and the modes of vibration along the thickness (z-axis) and width (x-axis) direction improves. Ideally, to preserve the vibrational modes in two directions the composite is formed into a 2-2 composite structure as shown in FIG. 7. This can be demonstrated in the impedance versus frequency plot shown in FIG. 10 for a 2-2 piezocomposite plate. As can be made evident in FIG. 10, the additional peaks between the characteristic resonance/anti-resonance peaks for the width mode of vibration and the thickness mode of vibration are absent and/or much smaller. This is as a result of the peaks associated with the fundamental resonance/anti-resonance frequency along the lateral vibration mode of the plate being suppressed or damped due to the layering of the composite structure in a 2-2 configuration. In addition to suppressing the peaks along the lateral mode of vibration, harmonics associated with this mode of vibration are also removed. The remaining smaller peaks are related to the harmonics associated with the other modes of vibration that have not been damped down, i.e. vibration along the width mode and the thickness mode. In FIG. 10, vibration along the width mode results in a resonance frequency at around 55 kHz and an anti-resonance frequency at around 60 kHz. Likewise, vibration along the thickness mode results in a resonance frequency at around 143 kHz and an anti-resonance frequency at around 174 kHz. The ratio between the anti-resonance frequency associated with the thickness of the composite and the anti-resonance frequency associated with the width of the composite is 2.9 which can be approximated to 3 and which is within 10% experimental error.

Whilst the anti-resonance/resonant frequency varies with the geometry of the part, the acoustic of the impedance of the vibrator body can be varied by varying the relative proportion of the material for generating and/or receiving acoustic or ultrasonic waves and the passive material, i.e. the density of the vibrator body. This will allow the acoustic impedance of the vibration body to be acoustically matched by the matching layer into the medium. Thus, the piezocomposite structure shown in FIG. 7, when acoustically or ultrasonically matched into the medium offers a dual frequency transducer with frequencies ranging between around 55 kHz to around 174 kHz. Thus, driving the vibration body whereby the different vibrational modes are provided by the part forming the vibrator body, allows the transducer to be used with a wide frequency bandwidth. For example, the first frequency mode of the first vibration mode is in the range 50 to 150 kHz and the second frequency mode of the second vibration mode is in the range 150 to 250 kHz.

In a second embodiment of the present invention, the same arrangement of the vibrator body can be used as shown in FIG. 2. In the second embodiment of the present invention, the acoustic impedance of the first part 3 is acoustically matched into the medium by the matching layer into the load or medium under investigation in a first frequency mode (FIG. 3*a*). However, the acoustic impedance of the first part 3 is tailored so that it matches the acoustic impedance of the second part 4 into the load or medium under investigation in the second frequency mode of operation given by FIG. 3*b*. Thus, the second part is subjected to a double matching layer according to equations 4 and 5, the first matching layer being the first part 3 and the second matching layer being the external matching layer 5. In the particular embodiment and as described in FIG. 2, the first part can be a first piezocomposite 3 and the second part can be a second piezocomposite 4. In the particular embodiment, the first piezocomposite matches the acoustic impedance of the second piezocomposite in a low frequency of operation. In order to make the first piezocomposite material a matching layer for the second piezocomposite material, the acoustic impedance of the matching layer 5 is tailored to be same as the acoustic impedance of the matching layer for the first and second piezocomposite 3. Thus, in the second frequency mode shown in FIG. 3*b* (in this case, covering a low frequency range) whereby the second piezocomposite 4 is matched into the medium is subjected to a double matching layer provided by the first piezocomposite 3 and the matching layer 5 and according to equations 4 and 5 further increases the bandwidth. Not only is the first piezocomposite is tailored to match the second piezocomposite into the load in the second frequency mode (FIG. 3*b*), the matching layer 5 matches the acoustic impedance of the first piezocomposite into the medium in the first frequency mode (FIG. 3*a*). In the particular embodiment, the first piezocomposite covers the high frequency range. While this embodiment demonstrates the implementation of two piezocomposite plates; the technique could be applied to three or more frequencies, using three or more piezocomposite transducers. When this design technique is applied, it works for all layers so all layers contribute to multiple matching layer bandwidths. The lower frequencies get increasing improvements in bandwidth due to extra matching layers. There is no restriction as to the frequency range covered by the different frequency modes operated by the first composite or second composite or the combination of the first and second composite. For example, the frequencies covered in the second frequency mode (second composite) may be greater than that covered by in the first frequency mode (first composite), e.g. the second composite covers the high frequency range and the first composite covers the low frequency range.

If material permitting with the appropriate acoustic impedance, it may be possible to select the matching layer 5 to be able to survive in water for long periods. This advantageously removes the need for a separate front sealing layer, since the front sealing layer is provided by the matching layer 5.

Selecting the thickness of the matching layer 5 so that both frequency modes are matching into the load is slightly more complex than in the first embodiment. In an ideal situation, the thickness of the second matching layer for the second piezocomposite 4 (the first matching layer being the first piezocomposite 3) and the thickness of the first matching layer for the first piezocomposite 3 (given by the matching layer 5) agrees with equation 6, i.e. a quarter wavelength thickness. In other words, the quarter wavelength thickness of the matching layer of the first piezocomposite at the first frequency mode is an odd multiple of the quarter wavelength thickness of the second matching layer of the second piezocomposite at the second frequency mode, e.g. n in eq. 6 is equal to 1, 3, etc. Equally, a $\lambda/4$ thickness of the first matching layer (provided by the first piezocomposite 3) of second piezocomposite is equal to $3\lambda/4$ thickness for the matching layer 5 for the first piezocomposite. Ideally, the thickness of the first and second matching layer for the second piezocomposite 4 agrees with Equation 4 and 5. However, if the thickness of the first matching layer for the second piezocomposite 4 provided by the first piezocomposite 3 is designed as the quarter wavelength thickness given by equation 6 then this is a little over ⅓ thickness of the first piezocomposite 3 providing a resonant frequency around 40% of the first piezocomposite 3. Therefore, it isn't quite possible to use quarter wavelength thickness of the matching layer n=1 at the second frequency mode (provided by the first piezocomposite 3) and three quarter wavelength thickness n=3 at the first frequency mode (provided by the matching layer 5) as required by Equation 6.

Other parameters are necessary to vary the acoustic impedance of the first and second piezocomposite material in order to satisfy the above criteria. These include but not limited to the volume fraction of the piezoelectric ceramic and the passive filler or the matrix material in the piezocomposite material. Example 5 shows an example where the geometric parameters of the first and second piezocomposite material can be tailored so that the first piezocomposite material can be used to match the acoustic impedance of the second piezocomposite material into the medium.

The transducer according to the present invention can be used in a number of applications based on the generation and/or reception of ultrasonic/acoustic waves. These include but not limited to underwater SONAR applications, ultrasonic flow measurement (liquid and gas), ultrasonic level detection, medical air-in-line sensing and medical imaging.

Example 1

A 50% volume fraction of piezoelectric material and polymer is chosen for the first and second composite material as this is considered a reasonable choice for the device operating in pulse-echo operation. The piezoelectric material is PZT4D and is encased in a syntactic foam polymer to give an acoustic impedance of 12.65 MRayls. The syntactic foam polymer is an epoxy mixed with microspheres (small hollow plastic spheres in the range 20 μm-200 μm in diameter). The density of the piezocomposite material is calculated to be 4193.5 $kg/m^3$. This is matched into a medium or load such as water having an acoustic impedance of 1.48 MRayls. Table 1 shows the ideal thickness of the matching layer to match the acoustic impedance of the first and second piezocomposite material in both frequency modes given by, FIGS. 3*a* and 3*c* into the medium, in this case water having an acoustic impedance of 1.48 MRayls. Based on a single matching layer, the thickness of first piezocomposite would be 11.1 mm in this example, to give a resonant frequency, $f_r$, of 135 kHz and anti-resonant frequency, $f_a$, 179.55 kHz for the second piezocomposite. The thickness of the second piezocomposite in this example would be 22.2 mm, so that when combined with the first piezocomposite, the resonant frequency will be 45 kHz and an anti-resonant frequency of 59.85 kHz. Assuming longitudinal velocity $v_1$=3300 m/s, the optimum thickness of the first matching layer is 13.78 mm providing a $$\frac{\lambda}{4}$$

matching layer thickness for the frequency mode given by FIG. 3*c* (second frequency mode) and a $3\lambda/4$ thickness for the frequency mode given by FIG. 3*a* (first frequency mode). By selecting substantially odd anti-resonant or resonant frequencies, a $3\lambda/4$ matching layer thickness at a resonant frequency 135 kHz (anti-resonant frequency of 179.55 kHz) is equal to a $1\lambda/4$ matching layer thickness at a resonant frequency, 45 kHz (anti-resonant frequency of 59.85 kHz).

If a single matching layer is used according to this example, the optimum acoustic impedance according to Equation 3 is 4.32 MRayl. Carbon graphite is a suitable choice for this, as are some loaded epoxies such as Stycast 2651, manufactured by Emerson and Cumings Polymers Encapsulants.

Example 2

Using the same piezocomposite material composition as described in Example 1 but using two matching layers into a water load (1.48 MRayl) and applying equations 4 & 5, the optimum matching layer impedance is 6.2 MRayl and 3.0 MRayl respectively. For the first matching layer carbon graphite is a close approximate (~5.5 MRayl) or certain loaded epoxies, such as Stycast 2850FT. For the second matching layer many epoxies and plastics can be used, such as PX771C from Robnor Resins Ltd.

Assuming a longitudinal velocity $v_1$ equal to 2500 m/s for the second matching layer, the optimum thickness is 10.44 mm providing a 1λ/4 matching layer thickness for the frequency mode given by FIG. 3*c* and 3λ/4 thickness for the frequency mode given by FIG. 3*a* (see Table 1). Thus, by selectively choosing the resonant frequency or anti-resonant frequency of the first and second piezocomposite material, the transducer can be tailored to operate over a wideband frequency range without the need to independently match the transducers.

If the transducer is backed with an absorbing material such as silicon carbide loaded epoxy, rather than air backed, the overall 3 dB bandwidth of this structure would be 45-75 kHz for the low frequency mode and 140-220 kHz for the high frequency mode.

TABLE 1

Quarter and three quarter wavelength thickness of the matching layers for a first high frequency mode given by FIG. 3a and a second low frequency mode given by FIG. 3c.

| Property | First matching layer for Frequency mode 2 | First Matching layer for frequency mode 1 | Second matching layer for Frequency mode 2 | Second matching layer for frequency mode 1 |
|---|---|---|---|---|
| $v_l$ (matching layer, m/s) | 3300 | 3300 | 2500 | 2500 |
| $f_r$ (composite, kHz) | 45.00 | 135.00 | 45.00 | 135.00 |
| $f_a$ (composite, kHz) | 59.85 | 179.55 | 59.85 | 179.55 |
| tk of λ/4 (mm) | 13.78 | 4.59 | 10.44 | 3.48 |
| tk of 3λ/4 (mm) | | 13.78 | | 10.44 |

Example 3

In this example, the radial mode of vibration and the thickness mode of vibration of a piezoelectric disc forming the vibrator body are used. The piezoelectric disc is a Type I having a radius of 42 mm and thickness of 12.2 mm and a density of 7650 kg/m$^3$, giving an acoustic impedance of 34.5 MRayls for the piezoelectric disc. This is to be matched into a medium or load such as water having an acoustic impedance of 1.48 MRayls. Table 2 shows the ideal thickness of the matching layer to match the acoustic impedance of the piezoelectric disc along the radial vibrational mode and the thickness vibrational mode of the disc into the medium, in this case water having an acoustic impedance of 1.48 MRayls. Based on the geometry specified above, a piezoelectric ceramic disc will have a resonant frequency, fr, of 57.14 kHz and anti-resonance frequency, fa, of 60.00 kHz along the radial vibration mode (see FIG. 5*b*) and a resonance frequency, fr, of 171.43 kHz and anti-resonance frequency of 180.00 kHz along the thickness mode of vibration (see FIG. 5*a*).

Figure 5B:
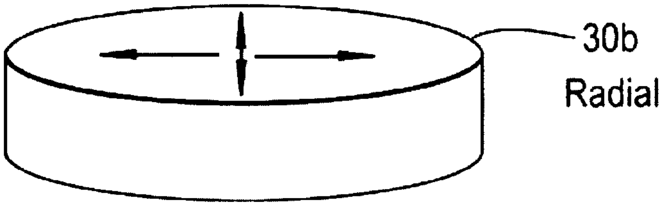

Assuming a longitudinal velocity $v_1$=3070 m/s, the optimum thickness of the matching layer is 12.79 mm providing a $$\frac{\lambda}{4}$$

matching thickness for the frequency mode along the radial vibration mode given by FIG. 5*b* and a 3λ/4 matching layer thickness for the frequency mode given by FIG. 5*a*. In this example and in consistency with the terminology used above, the thickness vibrational mode represents the first vibrational mode and the radial mode of vibration represents the second vibrational mode. By selecting odd anti-resonance or resonance frequencies, a 3λ/4 matching layer thickness at a resonant frequency 171.43 kHz (anti-resonant frequency 180 kHz) is equal to a $$\frac{\lambda}{4}$$

matching layer thickness at a resonant frequency, 57.14 kHz (anti-resonant frequency of 60.00 kHz).

If a single matching layer is used according to this example, the optimum acoustic impedance of the matching layer to match the piezoelectric disc having an acoustic impedance of 34.5 MRayl into a medium having an acoustic impedance of 1.48 MRayl according to Equation 3 is 7.15 MRayl. Carbon in the form of graphite is a suitable choice for this, as are some loaded epoxies such as Stycast 2850FT, manufactured by Emerson and Cummings Polymer Encapsulants.

Example 4

Using the same piezoelectric disc as described in Example 3 but using two matching layers into a water load (1.48 MRayl) and applying equations 4 & 5, the optimum matching layer impedance is 12.08 MRayl and 4.23 MRayl respectively. For the first matching layer copper graphite is a close approximate (~10 MRayl) or certain loaded epoxies. For the second matching layer carbon/graphite can be used as can loaded epoxies such as Stycast 2651 manufactured by Emmerson and Cummings Polymer Encapsulants.

Assuming a longitudinal velocity $v_1$ equal to 3070 m/s for the first matching layer, the optimum thickness is 12.79 mm providing a λ/4 matching layer thickness for the frequency mode given by FIG. 5*b* (radial vibrational mode) and 3λ/4 thickness for the frequency mode given by FIG. 5*a* (thickness vibrational mode) (see Table 2). Thus, by selectively choosing the resonant frequency or anti-resonant frequency of the first and second vibrational modes of the part forming the vibrator body, the transducer can be tailored to operate over a wideband frequency range without the need to independently match the transducers.

Assuming a longitudinal velocity $v_1$ equal to 2936 m/s for the second matching layer, the optimum thickness is 12.23 mm providing a λ/4 matching layer thickness for the frequency mode given by FIG. 5*b* (radial vibrational mode) and 3λ/4 thickness for the frequency mode given by FIG. 5*a* (thickness vibrational mode) (see Table 2). Thus, by selectively choosing the resonant frequency or anti-resonant frequency of the first and second vibrational modes of the part forming the vibrator body, the transducer can be tailored to operate over a wideband frequency range without the need to independently match the transducers.

If the transducer is backed with an absorbing material such as silicon carbide loaded epoxy, rather than air backed, the overall 6 dB bandwidth in the Figure Of Merit structure would be 34-57 kHz for the low frequency mode and 156-230 kHz for the high frequency mode, allowing some ripple for the high frequency mode. FIGS. 12, 13 and 14 shows the plots of the Transmit Voltage Response, Receiver Voltage Sensitivity and the Figure of Merit respectively calculated from equations 10, 11 and 12 of the transducer using the piezoelectric disc in this example. A transducer whose figure of merit response has a wide bandwidth is generally has a flat response and runs across the entire frequency range. In FIG. 12, it can be seen that the transducer had a generally flat response over the frequency range between 156 kHz and 230 kHz for the high frequency mode and 34-57 kHz for the low frequency mode. One major effect of wide bandwidth is it produces a short ring down time. This allows the user to distinguish between objects close together within the transducers field of view, for example, being able to distinguish fish close to the sea bed. Additionally, it is possible to use more advanced imaging algorithms such as Chirp algorithms (requires driving with a frequency sweep) or Synthetic Aperture Focusing Techniques (SAFT). Using the higher frequency will increase the target resolution further. Using the lower frequency results in a wider beam and better deep-water performance, for which the increased bandwidth also offers some increase in options.

TABLE 2

Quarter and three quarter wavelength thickness of the matching layers for a low frequency mode given by the radial vibrational mode (FIG. 5b) and a high frequency mode given by the thickness vibrational mode (FIG. 5a).

| Property | First matching layer for Frequency mode 2 (radial mode) | First Matching layer for frequency mode 1 (thickness mode) | Second matching layer for Frequency mode 2 (radial) | Second matching layer for frequency mode 1 (thickness) |
|---|---|---|---|---|
| $v_l$ (matching layer, m/s) | 3070 | 3070 | 2936 | 2936 |
| $f_r$ (composite, kHz) | 57.14 | 171.43 | 57.14 | 171.43 |
| $f_a$ (composite, kHz) | 60 | 180 | 60 | 180 |
| tk of λ/4 (mm) | 12.79 | 4.26 | 12.23 | 4.08 |
| tk of 3λ/4 (mm) | | 12.79 | | 12.23 |

Example 5

Tables 3 and 4 can be used to select volume fraction (ceramic-piezoelectric material) and filler (passive) material of the composite to give appropriate impedance values to provide both first piezocomposite 3 (composite 1) and the second piezocomposite 4 (composite 2) matching into the load. The one used for this implementation (option 2) is highlighted in bold and underlined.

TABLE 3

Acoustic Impedance of the first and second piezocomposite material at different geometric parameters.

| | Option 1 | | Option 2 | | Option 3 | |
|---|---|---|---|---|---|---|
| | Composite 1 | Composite 2 | Composite 1 | Composite 2 | Composite 1 | Composite 2 |
| Ceramic volume fraction | 0.29 | 0.75 | **0.25** | **0.6** | 0.22 | 0.5 |
| Ceramic density (kg/m$^3$) | 7800 | 7800 | 7800 | 7800 | 7800 | 7800 |
| Ceramic longitudinal velocity (m/s) | 4160 | 4160 | 4160 | 4160 | 4160 | 4160 |
| Epoxy density (kg/m3) | 1149 | 1149 | 1149 | 1149 | 1149 | 1149 |
| Microsphere longitudinal velocity | 400 | 400 | 400 | 400 | 400 | 400 |
| Microsphere density (kg/m3) | 25 | 25 | 25 | 25 | 25 | 25 |
| Microsphere volume fraction | 0.5 | 0.5 | 0.5 | 0.5 | 0.5 | 0.5 |
| Mixed polymer density (kg/m3) | 587 | 587 | 587 | 587 | 587 | 587 |
| Composite longitudinal velocity (m/s)* | 2900 | 3016 | 2900 | 3016 | 2900 | 3016 |

TABLE 3-continued

Acoustic Impedance of the first and second piezocomposite material at different geometric parameters.

| | Option 1 | | Option 2 | | Option 3 | |
|---|---|---|---|---|---|---|
| | Composite 1 | Composite 2 | Composite 1 | Composite 2 | Composite 1 | Composite 2 |
| Composite density (kg/m3) | 2678.77 | 5996.75 | 2390.25 | 4914.8 | 2173.86 | 4193.5 |
| Acoustic Impedance Z (Rayl) | 7.77E+06 | 18.09E+06 | 6.93E+06 | 14.82E+06 | 6.30E+06 | 12.65E+06 |

TABLE 4

Calculated matching layer impedance calculated from equations 4 and 5 for the double matching of Composite 2 based on the piezoelectric volume fractions defined in Table 3.

| Acoustic Impedance (MRayl) | Option 1 | Option 2 | Option 3 |
|---|---|---|---|
| Composite 2 | 18.09 | 14.82 | 12.65 |
| Load (water) | 1.48 | 1.48 | 1.48 |
| Matching layer 1 (composite 1) | 7.85 | 6.88 | 6.19 |
| Matching layer 2 | 3.41 | 3.19 | 3.03 |

Based on the calculations of the first and second matching layers for Composite 2 (second piezocomposite 4) in option 2 shown in Table 4 and according to equations 4 and 5, the first matching layer has an acoustic impedance of 6.88 MRayl and the second matching layer has an acoustic impedance of 3.19 MRayl. It is a feature of this arrangement that to match composite 1 (first piezocomposite 3) into the load it would have one matching layer, hence putting the acoustic impedance for composite 1 (6.88 MRayl) and water (1.48 MRayl) into Equation 3, gives the result 3.19 MRayl. Therefore, the second matching layer 5 (see FIG. 2) for composite 2 (the first matching layer being composite 1) and the first matching layer for composite 1 can be the same material. This continues to hold if three or more composites are used.

3.19 MRayl is a good number because it is realistic in terms of the availability of material since a number of thermoplastics (ABS/PC such as Cycoloy or Polyetherimide, such as the trade name Ultem 1000) or epoxies (PX771C from Robnor Resins, EPO-TEK 301 from Epoxy Technologies). In this case, the use of PX771C with a density of 1100 kg/m3 and longitudinal velocity of 2600 m/s gives an acoustic impedance of 2.9 MRayl which is close enough to provide good matching.

Using Equation 8, and from the composite longitudinal velocity for composite 2 given in Table 3 (3016 m/s) the required thickness of 21.85 mm will give a resonant frequency of 69 kHz. The resulting anti-resonant frequency of 89.7 kHz means the required quarter wavelength thickness of the first matching layer would be 8.08 mm thick, as shown in Table 5.

Again from Equation 8 for composite 1, the resonant frequency, fr is 179.4 kHz. Generally, the resonant frequency of composite 1 will be between 2.5 and 2.9 times that of composite 2, depending on the electromechanical coupling coefficient (or fa/fr) of composite 2.

TABLE 5

Matching layer thicknesses for low (FIG. 3b) and high frequency (FIG. 3a) modes and determining possible layer thicknesses and frequencies that can be used.

| | Second frequency mode (low), matching layer thickness 1 ($1^{st}$ composite) | Second frequency mode (low), matching layer thickness 2 (carbon) | Matching layer for first frequency mode (high) |
|---|---|---|---|
| Longitudinal velocity of matching layer (m/s) | 2900 | 2600 | 2600 |
| fr (kHz) | 69.00 | 69.00 | 179.40 |
| fa (kHz) | 89.70 | 89.70 | 227.84 |
| λ/4 (mm) | 8.08 | 7.25 | 2.85 |
| 3 λ/4 (mm) | | | 8.56 |

For the second frequency mode (FIG. 3*b*) shown in Table 5 to cover the low frequency, the quarter wavelength thickness of the first matching layer for composite 2 (second piezocomposite) is calculated to be 8.08 mm based on having composite 1 (first piezocomposite) as the only matching layer (see first column in Table 5) and 7.25 mm for the second matching layer (matching layer 5—in this example given by carbon) based on a double matching layer calculation given by equations 4 and 5 (second column in Table 5). For the first frequency mode designed to cover the high frequency, the matching layer 5 (in this example given by carbon) acoustically matches the acoustic impedance of the first piezocomposite (composite 1) into the medium. From the calculations of the quarter wavelength thickness of the matching layer giving by equation 6 shown in Table 5, the ideal thickness of the matching layer for the first frequency mode is 8.56 mm. Thus, according to the thickness calculations shown in Table 5, the appropriate matching layer thickness for optimally matching the first and second composite having properties shown in Tables 3 and 4 over a wide frequency bandwidth can thus be determined. In the particular example, it is not possible to have a perfect quarter wavelength matching layer thickness for the second matching layer for composite 2 and three-quarter quarter wavelength thickness for the first matching layer for composite 1, as shown in Table 5. As a compromise between the two modes the thickness selected could be 7.9 mm. This is sufficiently far away from a half wavelength (λ/2) matching layer thickness. This is because λ/2 is the condition of the resonant frequency of the composite material due to the multiple reflection of the ultrasonic waves from the surface of the composite material. Operating at the resonant frequency of the composite material would not only result in strong wave amplitude at a defined frequency but will limit bandwidth. While the compromise between the two modes will reduce bandwidth slightly over an exact quarter or ¾λ system, bandwidths that allow the transducer to stop reverberating within two cycles will still be possible, using this method or in conjunction with additional matching layers. So this implementation could provide bandwidth of 50 kHz to 85 kHz for the low frequency mode, and to 135 kHz to 224 kHz for the high frequency mode. Hence, this implementation covers both 50 kHz and 200 kHz frequencies used in this application.

The present invention is not restricted to two materials for generating and/or receiving ultrasonic or acoustic waves and two or more matching layers could also be used whereby equation 2 would be expanded appropriately (see Example 6). Three or more composites or a stack of composites could also be used, each using the adjacent composite as the next matching layer in the system. By utilising the controllable volume fraction afforded by 1-3 stack of composite transducers it is possible to layer composites and select the acoustic impedances necessary to use one or more of these layers as a matching layer itself. Similarly, there is the option to apply a voltage from the top of the top composite to the bottom of the bottom composite to obtain a lower frequency matched through the same layer.

Example 6

In the case where the second piezocomposite 4 (composite 2) is matched by three matching layers, then according to equation 2, the respective acoustic impedance of the first, second and third matching layers are given by equating n=3 in Equation 2. Thus, with reference to the vibrator body shown in FIG. 2 an additional third matching layer is coupled to the matching layer 5, i.e. the vibrator body comprises a stack of four layers, two of the lower layers are attributed to the composite layers and two of the top layers are attributed to the different matching layers. Thus in this example, the second piezocomposite 4 (composite 2) is matched by the first piezocomposite 3 (composite 1), the matching layer 5 and an additional matching layer (not shown in FIG. 2)

For the first matching layer, j=1, then the acoustic impedance of the first matching layer is calculated from:

$$Z_{ml(1)} = \sqrt[*]{Z_{tx}^2 \times Z_L^1} \tag{26}$$

For the second matching layer, j=2, then the acoustic impedance of the second matching layer is calculated from:—

$$Z_{ml(2)} = \sqrt[*]{Z_{tx}^2 \times Z_L^2} \tag{27}$$

For the third matching layer, j=3, then the acoustic impedance of the third matching layer is calculated from:—

$$Z_{ml(3)} = \sqrt[*]{Z_{tx}^1 \times Z_L^2} \tag{28}$$

In the case of the first composite 3 (composite 1), the first and second matching layers agree with equation 4 and 5 respectively.

Table 6 shows the volume fraction (ceramic) and filler (passive) material of the composite to give appropriate impedance values to provide both the first piezocomposite 3 (composite 1) and the second piezocomposite (composite 2) matching into the load, e.g. water having an acoustic impedance 1.48 MRaysl.

TABLE 6

Acoustic impedance of the first and second piezocomposite.

| | Ceramic volume fraction | |
|---|---|---|
| | 0.27<br>Composite 1 | 0.5<br>Composite 2 |
| Ceramic density (kg/m$^3$) | 7800 | 7800 |
| Ceramic longitudinal velocity (m/s) | 4160 | 4160 |
| Epoxy density (kg/m3) | 1149 | 1149 |
| Microsphere longitudinal velocity | 400 | 400 |
| Microsphere density (kg/m3) | 25 | 25 |
| Microsphere volume fraction | 0.5 | 0.5 |
| Mixed polymer density (kg/m3) | 587 | 587 |
| Composite longitudinal velocity (m/s) | 2900 | 3016 |
| Composite density (kg/m3) | 2534.51 | 4193.5 |
| Acoustic Impedance Z (MRayl) | 7.35E+06 | 12.65E+06 |

The acoustic impedance of the three matching layers for Composite 2 calculated from equations 26, 27 and 28 is shown in Table 7:—

TABLE 7

Calculated matching layer impedance from equations 26, 27 and 28 for the triple matching of Composite 2 based on the piezoelectric volume fractions defined in Table 6.

| | Acoustic Impedance (MRayl) |
|---|---|
| Composite 2 | 12.65 |
| Load (water) | 1.48 |
| Matching layer 1 | 7.40 |
| Matching layer 2 | 4.33 |
| Matching layer 3 | 2.53 |

As in Example 5, Composite 2 would operate at the low frequency range and Composite 1 would operate at the high frequency range. Based on the calculations of the first, second and third matching layers for Composite 2 (second piezocomposite 4) shown in Table 7 and according to equations 26, 27 and 28, the first matching layer has an acoustic impedance of 7.40 MRayl, the second matching layer would have an acoustic impedance of 4.33 MRayl and the third matching layer would have an acoustic impedance of 2.53 MRayl. The first matching layer for Composite 2 is the first piezocomposite 2 (composite 1).

It is a feature of this arrangement that to match composite 1 into the load it would have two matching layers; a first matching layer (high frequency) and a second matching layer (high frequency), hence putting the acoustic impedance for composite 1 (7.40 MRayl) and water (1.48 MRayl) into Equations 4 and 5, gives the result of 4.33 MRayl for the first matching layer of composite 1 (high frequency) and 2.53 MRayl for the second matching layer of composite 1 (high frequency). This agrees with Equations 27 and 28 for the second and third matching layers for composite 2 shown in Table 7. Therefore, the second and third matching layers for composite 2 and the first and second matching layers for composite 1 can be the same material.

4.33 MRayl and 2.53 MRayl are a good number because it is realistic in terms of the availability of material since a number of thermoplastics (ABS/PC such as Cycoloy or Polyetherimide, such as the trade name Ultem 1000) or epoxies (PX771C from Robnor Resins, EPO-TEK 301 from Epoxy Technologies, Stycast 2651-40). In this case, the use of Stycast 2651 with a density of 1500 kg/m$^3$ and longitudinal velocity of 2924 m/s gives an acoustic impedance of 4.4 MRayl which is close enough to provide good second matching composite 2 and first matching (high frequency) for composite. In this case, the use of PX771C with a density of 1100 kg/m3 and longitudinal velocity of 2600 m/s gives an acoustic impedance of 2.9 MRayl which is close enough to provide good third matching for composite 2 and second matching for composite 1.

Using Equation 8, and from the composite longitudinal velocity for composite 2 given in Table 6 (3016 m/s) the required thickness of 25 mm will give a resonant frequency of 67 kHz. The resulting anti-resonant frequency of 77 kHz means the required quarter wavelength thickness of the first matching layer would be 9.09 mm thick, as shown in Table 4.

Again from Equation 8 for composite 1, the resonant frequency, fr is 154.10 kHz. Generally, the resonant frequency of composite 1 will be between 2.5 and 2.9 times that of composite 2, depending on the electromechanical coupling coefficient (or fa/fr) of composite 2.

TABLE 8

Matching layer thickness for the low and high frequency modes. Stycast 2651-40 is the first matching layer for composite 1 (high frequency mode) and second matching layer for composite 2 (low frequency mode). PX771C epoxy is the second matching layer for composite 1 (high frequency mode) and the third matching layer for composite 2 (low frequency mode).

| | | Thickness calculation | | | | |
|---|---|---|---|---|---|---|
| | Low frequency mode, | Second(low Freq)/First (high freq) matching layer (Stycast 2651-40) | | | Third (low freq.)/Second (hi freq.) Matching layer (PX771C) | |
| Select | matching layer thickness 1 ($1^{st}$ composite) | Low frequency mode, matching layer thickness 2 | Matching layer for high frequency mode | | Low frequency mode, matching layer thickness 2 | Matching layer for high frequency mode |
| vl | 2800 | 2924 | 2924 | | 2536 | 2536 |
| fr (kHz) | 67.00 | 67.00 | 154.10 | | 67.00 | 154.10 |
| fa (kHz) | 77.05 | 77.05 | 192.62 | | 77.05 | 192.65 |
| fa (kHz) | 77.05 | 77.05 | 192.63 | | 77.05 | 192.63 |
| lambda/4 (mm) | 9.09 | 9.49 | 3.79 | | 8.23 | 3.29 |
| 3 lambda/4 (mm) | | | 11.38 | | | 9.87 |
| | | | Compromise | 10.44 | Compromise | 9.05 |

For the case where composite 2 is matched by three matching layer shown in Table 7, in order for composite 2 to cover the low frequency mode as shown in Table 8, the quarter wavelength thickness of the matching layers for composite 2 is calculated to be 9.09 mm based on having composite 1 as the first matching layer (first column in Table 8), 9.49 mm for Stycast 2651-40 as the second matching layer (second column in Table 8) and 8.23 mm for PX771C epoxy as the third matching layer (fourth column in Table 8). For the high frequency mode covered by composite 1, the first matching layer (high frequency) is provided by Stycast 2651-40 having a thickness of 11.38 mm and a second matching layer (high frequency) provided by PX771C having a thickness of 9.87 mm.

In the particular example, it is not possible to have a perfect quarter wavelength matching layer thickness for the second matching layer for composite 2 and three quarter wavelength thickness for the first matching layer for composite 1, as shown in Table 8. In both the cases, the matching layer comprises Stycast 2651-40. As a compromise between the two modes the thickness selected could be 10.44 mm.

Likewise, it is not possible to have a perfect quarter wavelength matching layer thickness for the third matching layer for composite 2 and three quarter wavelength thickness for the second matching layer for composite 1, as shown in Table 8. In both the cases, the matching layer comprises Robnor PX771. As a compromise between the two modes the thickness selected could be 9.05 mm.

Whilst the shape of the piezocomposite materials in the specific embodiments used discs, the technique could equally apply to plates or other geometries. As a result of the present invention, it is possible to monitor the reception characteristics across all three modes to pick up frequency content from 20 kHz to 220 kHz.

The invention claimed is:

1. A transducer comprising:— a. a vibrator body for generating and/or receiving acoustic or ultrasonic waves having:— i. a first anti-resonance frequency, and ii. a second anti-resonance frequency, b. a matching layer having a substantially single acoustic impedance, the matching layer coupled to said vibrator body so as, in use, to acoustically match the vibrator body to a medium, wherein said first anti-resonance frequency is substantially an odd multiple of said second anti-resonance frequency.

2. A transducer as claimed in claim 1, wherein the vibrator body resonates at:— a. a first resonant frequency; and b. a second resonant frequency;

wherein the first resonant frequency is substantially an odd multiple of the second resonant frequency.

3. A transducer as claimed in claim 1, wherein the vibrator body comprises:— a. a first part operable for generating and/or receiving acoustic or ultrasonic waves, wherein the first part is acoustically coupled to b. a second part for generating and/or receiving acoustic or ultrasonic waves.

4. A transducer as claimed in claim 3, wherein the first part has an anti-resonance frequency at the first anti-resonance frequency and the combined first and second part has an anti-resonance frequency at the second anti-resonance frequency.

5. A transducer as claimed in claim 3, wherein the first part is operable for resonating at a first resonance frequency and the combined first and second part are operable for resonating at the second resonance frequency.

6. A transducer as claimed in claim 3, wherein the thickness of the matching layer is a quarter wavelength of the ultrasonic or acoustic waves in the matching layer, wherein the quarter wavelength thickness of the matching layer associated with the first part is an odd multiple of the quarter wavelength thickness associated with the combination of the first and second part.

7. A transducer as claimed in claim 3, wherein the matching layer matches acoustic impedance of a. the first part in a first frequency mode and b. the combined first and second part in a second frequency mode.

8. A transducer as claimed in claim 1, wherein the vibrator body has a first vibration mode and a second vibration mode, said first vibration mode has an anti-resonance frequency at the first anti-resonance frequency and said second vibration mode has an anti-resonance frequency at the second anti-resonance frequency.

9. A transducer as claimed in claim 2, wherein the vibrator body in the first vibration mode of the vibrator body is operable for resonating at the first resonance frequency and the vibrator body in the second vibration mode of the vibrator body is operable for resonating at the second resonance frequency.

10. A transducer as claimed in claim 8, wherein the thickness of the matching layer is a quarter wavelength of the ultrasonic or acoustic waves in the matching layer, wherein the quarter wavelength thickness of the matching layer associated with the first vibration mode of the vibrator body is an odd multiple of the quarter wavelength thickness associated with the second vibration mode of said vibrator body.

11. A transducer as claimed in claim 7, wherein the first vibration mode is associated with the radial or lateral or thickness or width mode of vibration of the vibrator body and the second vibration mode is associated with the radial or lateral or thickness or width mode of that vibrator body.

12. A transducer as claimed in claim 7, wherein the matching layer is operable for acoustically matching the first vibration mode of the vibrator body in a first frequency mode and the second vibration mode of the vibrator body in a second frequency mode.

13. A transducer as claimed in claim 7, wherein the vibrator body comprises a part operable for generating and/or receiving acoustic or ultrasonic waves.

14. A transducer, comprising:— a. a vibrator body comprising:— i. a first part for generating and/or receiving acoustic or ultrasonic waves resonating at a first resonance frequency;

acoustically coupled to ii. a second part for generating and/or receiving acoustic or ultrasonic waves at a second resonance frequency and, b. a matching layer having a substantially single acoustic impedance, the matching layer coupled to said vibrator body wherein the thickness of the matching layer is a quarter wavelength of the ultrasonic or acoustic waves in the matching layer so as, in use, to acoustically match the first part and the second part to a medium;

wherein the acoustic impedance of the first part is acoustically matched into the medium by said matching layer and the acoustic impedance of the second part is acoustically matched into the medium by a first matching layer and a second matching layer, said first matching layer being said first part and said second matching layer being said matching layer wherein the thickness of the matching layer lies between an odd multiple of the quarter wavelength thickness of the second matching layer of the second part and the quarter wavelength thickness of the matching layer of the first part.

15. A transducer comprising:— a. a vibrator body comprising:— i. a first part for generating and/or receiving acoustic or ultrasonic waves;

acoustically coupled to ii. a second part for generating and/or receiving acoustic or ultrasonic waves and, b. a matching layer having a substantially single acoustic impedance, the matching layer coupled to said vibrator body wherein the thickness of the matching layer is a quarter wavelength of the ultrasonic or acoustic waves in the matching layer so as, in use, to acoustically match the first part and the second part to a medium;

wherein the acoustic impedance of the first part is acoustically matched into the medium by said matching layer and the acoustic impedance of the second part is acoustically matched into the medium by a first matching layer and a second matching layer, said first matching layer being said first part and said second matching layer being said matching layer wherein the quarter wavelength thickness of the matching layer of the first part is substantially an odd multiple of the quarter wavelength thickness of the second matching layer of the second part.

16. A transducer as claimed in claim 14, wherein the acoustic impedance of the first part is acoustically matched into the medium by said matching layer in a first frequency mode and the acoustic impedance of the second part is acoustically matched into the medium by a first matching layer and a second matching layer in a second frequency mode.

17. A transducer as claimed in claim 1, wherein the vibrator body comprises a composite body, said composite body comprising a material operable for generating and/or receiving ultrasonic/acoustic waves and a passive material.

18. A transducer as claimed in claim 17, wherein the composite body comprises alternate layers of the material operable for generating and/or receiving ultrasonic/acoustic waves and the passive material.

19. A transducer as claimed in claim 17, wherein the composite body is diced in one direction.

20. A transducer as claimed in claim 18, wherein the composite body has a 2-2 layered composite structure.

21. A transducer as claimed in claim 18, wherein the first anti-resonance frequency is associated with a first geometry of the vibrator body and the second anti-resonance frequency is associated with a second geometry of the vibrator body.

22. A transducer as claimed in claim 21, wherein the first geometry is different to the second geometry.

23. A transducer as claimed in claim 21, wherein the first geometry is associated with the radius and/or length and/or thickness and/or width of the vibrator body and the second geometry is associated with the radius and/or length and/or thickness and/or width of the vibrator body.

24. A transducer as claimed in claim 17, wherein the acoustic impedance of the vibrator body varies with the relative proportion of the material for generating and/or receiving ultrasonic waves and the passive material, wherein a variance of the acoustic impedance with the material is sufficient to acoustically match the vibrator body to the medium by the matching layer.

25. A transducer as claimed in claim 3, where the first part and/or second part is/are a first and/or a second composite material.

26. A transducer as claimed in claim 17, wherein the material for generating and/or receiving ultrasonic/acoustic waves is a piezoelectric or magnetostrictive or electrostrictive material.

27. A transducer as claimed in claim 1, wherein the vibrator body comprises a piezoelectric or magnetostrictive or electrostrictive material.

28. A transducer as claimed in claim 26, wherein the piezoelectric material is selected from the group consisting of PZT4D or PZT5A or PZT8 or barium titanate or PZT5J or PZT5H.

29. A transducer as claimed in claim 7, wherein the first frequency mode is in the range 135 kHz to 224 kHz.

30. A transducer as claimed in claim 7, wherein the second frequency mode is in the range 50 kHz to 85 kHz.

31. A transducer as claimed in claim 1, wherein the matching layer comprises carbon.

32. A transducer as claimed in claim 31, wherein the carbon is graphite.

33. A transducer as claimed in claim 1, wherein the transducer further comprises a backing layer coupled to the vibrator body and operable for absorbing ultrasonic or acoustic waves from the vibrator body.

34. A transducer as claimed in claim 33, wherein the acoustic impedance of the backing layer is substantially the same as the acoustic impedance of the vibrator body.

35. A transducer as claimed in claim 33, wherein the thickness of the backing layer is equal to $n\lambda/2$, where n is a number of cycle bursts of the transducer and $\lambda$ is the wavelength of the sound wave in the backing layer.

36. A transducer as claimed in claim 33, wherein the backing layer is operable for diffracting the acoustic waves away from the vibrator body.

37. A transducer as claimed in claim 36, wherein the backing layer is serrated.

38. A SONAR device comprising a transducer as defined in claim 1.

39. An ultrasonic device comprising a transducer as defined in claim 1.

* * * * *